(12) United States Patent  (10) Patent No.: US 8,837,048 B2
Jaster  (45) Date of Patent: Sep. 16, 2014

(54) DAYLIGHT COLLECTION SYSTEMS AND METHODS

(71) Applicant: Solatube International, Inc., Vista, CA (US)

(72) Inventor: Paul August Jaster, Carlsbad, CA (US)

(73) Assignee: Solatube International, Inc., Vista, CA (US)

( * ) Notice: Subject to any disclaimer, the term of this patent is extended or adjusted under 35 U.S.C. 154(b) by 26 days.

(21) Appl. No.: 13/687,803

(22) Filed: Nov. 28, 2012

(65) Prior Publication Data

US 2013/0135744 A1    May 30, 2013

Related U.S. Application Data

(60) Provisional application No. 61/565,402, filed on Nov. 30, 2011.

(51) Int. Cl.
*G02B 17/00* (2006.01)
*F21S 11/00* (2006.01)
*G02B 19/00* (2006.01)
*E04D 13/03* (2006.01)

(52) U.S. Cl.
CPC ............. *G02B 17/00* (2013.01); *F21S 11/002* (2013.01); *G02B 19/0028* (2013.01); *G02B 19/0038* (2013.01); *E04D 13/033* (2013.01); *F21S 11/007* (2013.01); *E04D 2013/0345* (2013.01)
USPC .......................................... 359/592; 359/597

(58) Field of Classification Search
CPC ..... F21S 11/002; F21S 11/005; F21S 11/007; E04D 13/033; E04D 13/0351; E04D 13/0358
USPC .......................................... 359/591, 597, 592
See application file for complete search history.

(56) References Cited

U.S. PATENT DOCUMENTS

| 668,404 A | 2/1901 | Hanneborg |
| 1,632,254 A * | 6/1927 | Vinogradov .................... 353/3 |

(Continued)

FOREIGN PATENT DOCUMENTS

| BE | 1 014 530 | 12/2003 |
| CA | 2337293 | 8/2002 |

(Continued)

OTHER PUBLICATIONS

International Search Report dated Mar. 4, 2013, International Application No. PCT/US2012/066890 filed Nov. 28, 2012.

(Continued)

*Primary Examiner* — Christopher Mahoney
(74) *Attorney, Agent, or Firm* — Knobbe, Martens, Olson & Bear, LLP

(57) ABSTRACT

Lighting devices and methods for illuminating the interior of a building with natural daylight are disclosed. In some embodiments, a daylighting apparatus includes a tube having a sidewall with a reflective interior surface, an at least partially transparent light collector with one or more light turning elements, and a light reflector positioned to reflect daylight into the light collector. The one or more light turning elements can turn direct and indirect daylight into the tube so that it is available to illuminate the building. In some embodiments, the tube is disposed between the light collector and a diffuser positioned inside a target area of a building. In certain embodiments, the tube is configured to direct at least a portion of the daylight transmitted through the light collector towards the diffuser.

39 Claims, 13 Drawing Sheets

(56) References Cited

U.S. PATENT DOCUMENTS

| | | |
|---|---|---|
| 2,858,734 A | 11/1958 | Boyd |
| 3,307,303 A | 3/1967 | Bloxsom |
| 4,018,211 A | 4/1977 | Barr |
| 4,078,548 A | 3/1978 | Kapany |
| 4,114,186 A | 9/1978 | Dominguez |
| 4,126,379 A | 11/1978 | Wu |
| 4,334,524 A | 6/1982 | McCullough et al. |
| 4,349,245 A * | 9/1982 | Kliman ............ 359/597 |
| 4,418,684 A * | 12/1983 | Sanders et al. ......... 126/621 |
| 4,429,952 A | 2/1984 | Dominguez |
| 4,539,625 A | 9/1985 | Bornstein et al. |
| 4,557,565 A | 12/1985 | Ruck et al. |
| 4,615,579 A | 10/1986 | Whitehead |
| 4,706,649 A * | 11/1987 | Hager ............. 126/606 |
| 4,720,170 A * | 1/1988 | Learn, Jr. ......... 359/597 |
| 4,733,505 A | 3/1988 | Van Dame |
| 5,099,622 A | 3/1992 | Sutton |
| 5,117,811 A | 6/1992 | Taylor |
| 5,228,772 A | 7/1993 | Mitchell et al. |
| 5,360,659 A | 11/1994 | Arends et al. |
| 5,467,564 A | 11/1995 | DeKeyser et al. |
| 5,493,824 A | 2/1996 | Webster et al. |
| 5,517,358 A | 5/1996 | Dominguez |
| 5,528,471 A | 6/1996 | Green |
| 5,546,712 A | 8/1996 | Bixby |
| 5,596,848 A | 1/1997 | Lynch |
| 5,648,873 A | 7/1997 | Jaster et al. |
| 5,655,339 A | 8/1997 | Deblock et al. |
| 5,662,403 A | 9/1997 | Akashi et al. |
| 5,729,387 A | 3/1998 | Takahashi et al. |
| 5,735,262 A | 4/1998 | Houtman |
| 5,830,548 A | 11/1998 | Andersen et al. |
| 5,878,539 A | 3/1999 | Grubb |
| 5,896,712 A | 4/1999 | Chao |
| 5,896,713 A | 4/1999 | Chao et al. |
| 5,897,201 A | 4/1999 | Simon |
| 5,983,581 A * | 11/1999 | DeBlock et al. ............. 52/200 |
| 5,999,323 A | 12/1999 | Wood |
| 6,000,170 A | 12/1999 | Davis |
| RE36,496 E | 1/2000 | Sutton |
| 6,035,593 A | 3/2000 | Chao et al. |
| 6,104,854 A | 8/2000 | Masaki et al. |
| 6,130,781 A | 10/2000 | Gauvin |
| 6,142,645 A | 11/2000 | Han |
| 6,178,707 B1 * | 1/2001 | Bengtson ............ 52/200 |
| 6,219,977 B1 | 4/2001 | Chao et al. |
| 6,239,910 B1 | 5/2001 | Digert |
| 6,256,947 B1 | 7/2001 | Grubb |
| 6,321,493 B1 | 11/2001 | Rillie et al. |
| 6,363,667 B2 | 4/2002 | O'Neill |
| 6,363,668 B2 | 4/2002 | Rillie et al. |
| 6,391,400 B1 | 5/2002 | Russell et al. |
| 6,412,238 B2 | 7/2002 | Rillie et al. |
| 6,415,563 B2 | 7/2002 | Rillie |
| 6,438,803 B2 | 8/2002 | Rillie et al. |
| 6,438,910 B1 | 8/2002 | Erskine |
| 6,456,437 B1 | 9/2002 | Lea et al. |
| 6,493,145 B1 | 12/2002 | Aoki et al. |
| 6,502,950 B2 | 1/2003 | Signer |
| RE38,217 E | 8/2003 | De Block et al. |
| 6,604,329 B2 | 8/2003 | Hoy et al. |
| 6,623,137 B1 | 9/2003 | Marsonette |
| 6,655,814 B1 | 12/2003 | Tagawa et al. |
| 6,691,701 B1 | 2/2004 | Roth |
| 6,699,558 B1 | 3/2004 | Milburn |
| 6,827,445 B2 | 12/2004 | Abe et al. |
| 6,840,645 B2 | 1/2005 | Eisenman et al. |
| 6,870,673 B2 | 3/2005 | Cromer et al. |
| 7,040,061 B2 | 5/2006 | Rillie et al. |
| 7,057,821 B2 | 6/2006 | Zincone |
| 7,082,726 B2 | 8/2006 | Prenn et al. |
| 7,134,254 B1 | 11/2006 | Van Gelder |
| 7,146,768 B2 | 12/2006 | Rillie |
| 7,159,364 B2 | 1/2007 | Rillie |
| 7,168,211 B2 | 1/2007 | Prenn et al. |
| 7,185,464 B2 | 3/2007 | Bracale |
| 7,222,461 B2 | 5/2007 | Piano et al. |
| 7,296,908 B1 | 11/2007 | Pickard et al. |
| 7,322,156 B1 | 1/2008 | Rillie et al. |
| 7,350,327 B1 | 4/2008 | Logan et al. |
| 7,395,636 B2 | 7/2008 | Blomberg |
| 7,438,440 B2 | 10/2008 | Dorogi |
| 7,455,422 B2 | 11/2008 | Gould et al. |
| 7,481,552 B2 | 1/2009 | Mayfield, III et al. |
| 7,501,768 B2 | 3/2009 | Lane et al. |
| 7,510,305 B2 | 3/2009 | Straton et al. |
| 7,529,594 B2 | 5/2009 | Walters et al. |
| 7,546,167 B2 | 6/2009 | Walters et al. |
| 7,546,168 B2 | 6/2009 | Walters et al. |
| 7,546,709 B2 | 6/2009 | Jaster et al. |
| 7,576,647 B1 | 8/2009 | Mudge |
| 7,585,088 B2 | 9/2009 | Tyson |
| 7,586,408 B1 | 9/2009 | Mudge |
| 7,603,184 B2 | 10/2009 | Walters et al. |
| 7,614,767 B2 | 11/2009 | Zulim et al. |
| 7,621,656 B2 | 11/2009 | Tyson |
| 7,622,701 B2 | 11/2009 | Stevens et al. |
| 7,639,423 B2 | 12/2009 | Kinney et al. |
| 7,642,501 B1 | 1/2010 | Fassbender et al. |
| 7,670,021 B2 | 3/2010 | Chou |
| 7,690,816 B2 | 4/2010 | Tyson et al. |
| 7,736,014 B2 | 6/2010 | Blomberg |
| 7,737,640 B2 | 6/2010 | Marques et al. |
| 7,757,444 B1 | 7/2010 | Halliday |
| 7,761,260 B2 | 7/2010 | Walters et al. |
| 7,771,095 B2 | 8/2010 | Dorogi |
| 7,784,971 B2 | 8/2010 | Dorogi |
| 7,806,550 B2 | 10/2010 | Tyson et al. |
| 7,813,041 B2 | 10/2010 | Briee et al. |
| 7,817,063 B2 | 10/2010 | Hawkins et al. |
| 7,828,459 B2 | 11/2010 | Rains |
| 7,839,295 B2 | 11/2010 | Ries, II |
| 7,845,825 B2 | 12/2010 | Ramer et al. |
| 7,845,829 B2 | 12/2010 | Shaner |
| 7,850,342 B2 | 12/2010 | Abdelsamed |
| 7,863,832 B2 | 1/2011 | Lane et al. |
| 7,866,855 B2 | 1/2011 | Abdelsamed |
| 7,883,237 B2 | 2/2011 | Zhang et al. |
| 7,883,239 B2 | 2/2011 | Rains, Jr. et al. |
| 7,886,492 B2 | 2/2011 | Kelly et al. |
| 7,896,521 B2 | 3/2011 | Becker et al. |
| 7,911,359 B2 | 3/2011 | Walters et al. |
| 7,918,589 B2 | 4/2011 | Mayfield, III et al. |
| 7,939,793 B2 | 5/2011 | Rains, Jr. et al. |
| 7,939,794 B2 | 5/2011 | Rains, Jr. et al. |
| 7,950,817 B2 | 5/2011 | Zulim et al. |
| 7,954,281 B2 | 6/2011 | Jaston |
| 7,957,065 B2 | 6/2011 | Jaster |
| 7,982,956 B2 * | 7/2011 | Kinney et al. ............. 359/591 |
| 8,010,319 B2 | 8/2011 | Walters et al. |
| 8,016,455 B2 | 9/2011 | Paulussen |
| 8,018,653 B2 | 9/2011 | Jaster |
| 8,082,705 B2 | 12/2011 | Jaster et al. |
| 8,083,363 B2 | 12/2011 | Jaster |
| 8,098,433 B2 | 1/2012 | Rillie et al. |
| 8,132,375 B2 | 3/2012 | Jaster |
| 8,205,385 B2 | 6/2012 | Konstantin |
| 8,205,386 B2 | 6/2012 | Konstantin |
| 8,245,444 B2 | 8/2012 | Konstantin et al. |
| 8,300,323 B2 | 10/2012 | Hoch et al. |
| 8,371,078 B2 | 2/2013 | Jaster |
| 8,491,138 B2 * | 7/2013 | O ................. 359/855 |
| 2001/0049916 A1 | 12/2001 | Rillie et al. |
| 2002/0060283 A1 | 5/2002 | Jordan et al. |
| 2004/0050380 A1 | 3/2004 | Abe et al. |
| 2005/0039789 A1 | 2/2005 | Kim |
| 2005/0078483 A1 | 4/2005 | Bernard et al. |
| 2005/0128728 A1 | 6/2005 | Eisenman et al. |
| 2005/0166490 A1 | 8/2005 | Darmer et al. |
| 2005/0188629 A1 | 9/2005 | Rillie et al. |
| 2005/0243430 A1 | 11/2005 | Cuttle |
| 2005/0252111 A1 | 11/2005 | Prenn et al. |
| 2006/0288645 A1 | 12/2006 | Konstantino et al. |
| 2007/0163732 A1 | 7/2007 | Konstantin et al. |

(56) References Cited

U.S. PATENT DOCUMENTS

| | | |
|---|---|---|
| 2007/0240705 A1* | 10/2007 | Papadopoulos ............ 126/690 |
| 2007/0266652 A1 | 11/2007 | Jaster et al. |
| 2007/0271848 A1 | 11/2007 | Wolf et al. |
| 2008/0035275 A1 | 2/2008 | Konstantin |
| 2008/0250733 A1 | 10/2008 | Konstantin |
| 2008/0304263 A1 | 12/2008 | Paulusssen |
| 2009/0032102 A1 | 2/2009 | Chen et al. |
| 2009/0113824 A1 | 5/2009 | Rillie |
| 2009/0141487 A1 | 6/2009 | Gould et al. |
| 2009/0322250 A1 | 12/2009 | Zulim et al. |
| 2010/0053971 A1 | 3/2010 | Aggarwal et al. |
| 2010/0091396 A1 | 4/2010 | Hutson et al. |
| 2010/0110684 A1 | 5/2010 | Abdelsamed et al. |
| 2010/0127625 A1 | 5/2010 | Minarczyk et al. |
| 2010/0149804 A1 | 6/2010 | Abdelsamed et al. |
| 2010/0232158 A1 | 9/2010 | McCanless |
| 2010/0246193 A1 | 9/2010 | Clifton et al. |
| 2010/0271610 A1 | 10/2010 | Soer et al. |
| 2010/0274945 A1 | 10/2010 | Westrick, Jr. et al. |
| 2011/0019410 A1 | 1/2011 | Ibanez et al. |
| 2011/0032709 A1 | 2/2011 | Tyson et al. |
| 2011/0051413 A1 | 3/2011 | Hand |
| 2011/0067824 A1 | 3/2011 | Konstantin et al. |
| 2011/0103042 A1 | 5/2011 | Tirrell et al. |
| 2011/0110086 A1 | 5/2011 | Barnwell et al. |
| 2011/0127557 A1 | 6/2011 | Ramer et al. |
| 2011/0134649 A1 | 6/2011 | Becker et al. |
| 2011/0242810 A1 | 10/2011 | Lopez Querol et al. |
| 2011/0289869 A1 | 12/2011 | Jaster et al. |
| 2012/0091897 A1* | 4/2012 | O et al. ............ 315/149 |
| 2012/0230020 A1 | 9/2012 | Rillie et al. |
| 2013/0083554 A1 | 4/2013 | Jaster |
| 2013/0135744 A1 | 5/2013 | Jaster |

FOREIGN PATENT DOCUMENTS

| | | |
|---|---|---|
| CN | 1399095 A | 2/2003 |
| CN | 201035179 Y | 3/2008 |
| CN | 201090939 Y | 7/2008 |
| CN | 101493205 A | 7/2009 |
| DE | 4012333 C1 | 6/1991 |
| DE | 4140851 A1 | 6/1993 |
| EP | 1 306 606 | 5/2003 |
| ES | 2 194 616 | 11/2003 |
| ES | 2 214 950 | 9/2004 |
| GB | 933133 | 8/1963 |
| GB | 2 384 022 | 7/2003 |
| GB | 2 400 885 | 10/2007 |
| JP | 60142413 | 9/1985 |
| JP | 60164704 | 11/1985 |
| JP | 60166906 | 11/1985 |
| JP | H06 111610 | 4/1994 |
| JP | H08 7619 | 1/1996 |
| JP | 2001 184913 | 7/2001 |
| JP | 2002 138634 | 5/2002 |
| JP | 2003 157707 | 5/2003 |
| KR | 10 0713802 | 5/2007 |
| KR | 10-2009-0113435 | 11/2009 |
| KR | 10 0970152 | 7/2010 |
| KR | 10 2011 0032039 | 3/2011 |
| KR | 10 2011 0062239 | 6/2011 |
| WO | WO 2006/028703 | 3/2006 |
| WO | WO 2010/070169 | 6/2010 |
| WO | WO 2013/093796 * | 6/2013 ........ F21V 5/00 |

OTHER PUBLICATIONS

"LED Light add on Kit for skylight tubes," Wild Ideas Light Company Ltd., published at least as early as Apr. 2009.

"2301 Optical Lighting Film" Technical Specification, Effective Date: Feb. 1, 2000, 3M Specified Construction Products Department, http://www.mmm.com/office.

"3M Daylighting Film DF2000MA", Product Bulletin DF2000MA, Release A, Jun. 2006, 3M Graphics Market Center, St. Paul, MN.

Ge et al., "Heat Loss Calculation of Compound Honeycomb Solar Collection"; Journal of Thermal Science, vol. 2, No. 4, pp. 254-259, Oct. 1993.

Kaushika et al., "Solar Transparent Insulation Materials: A Review"; Renewable and Sustainable Energy Reviews, vol. 7, pp. 317-351, 2003.

Sunflower Corporation, "Sustainable Commercial Daylighting Technical Overview", undated, received on Dec. 11, 2009.

Dulley, James, "Today's Technology and You; Skylight tube solves lighting problems", Illinois Country Living, Apr. 2000.

* cited by examiner

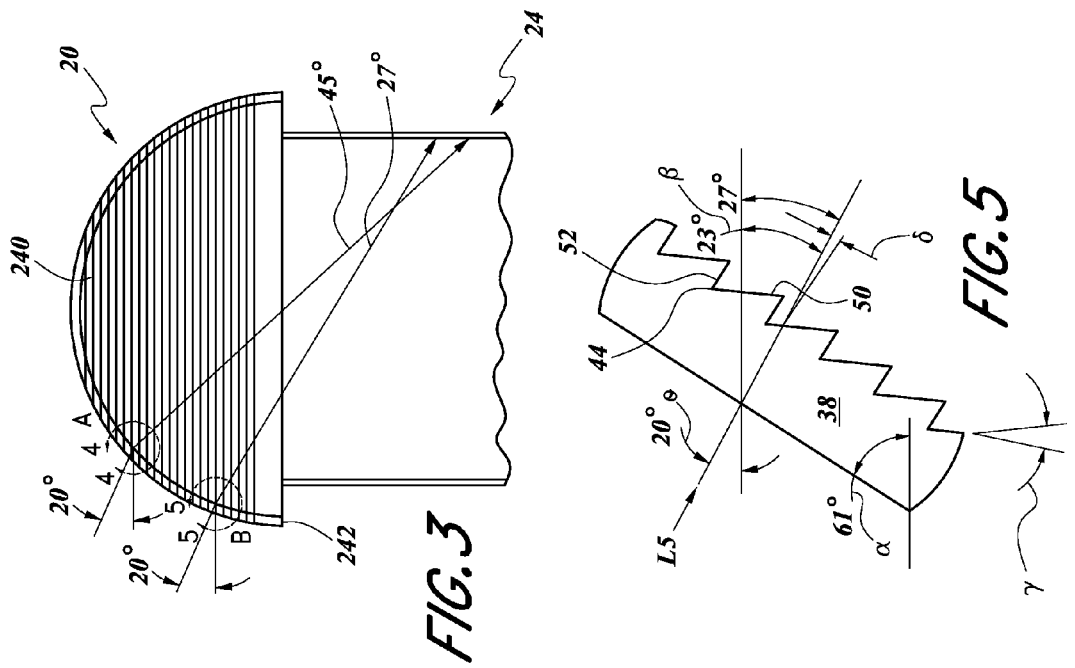
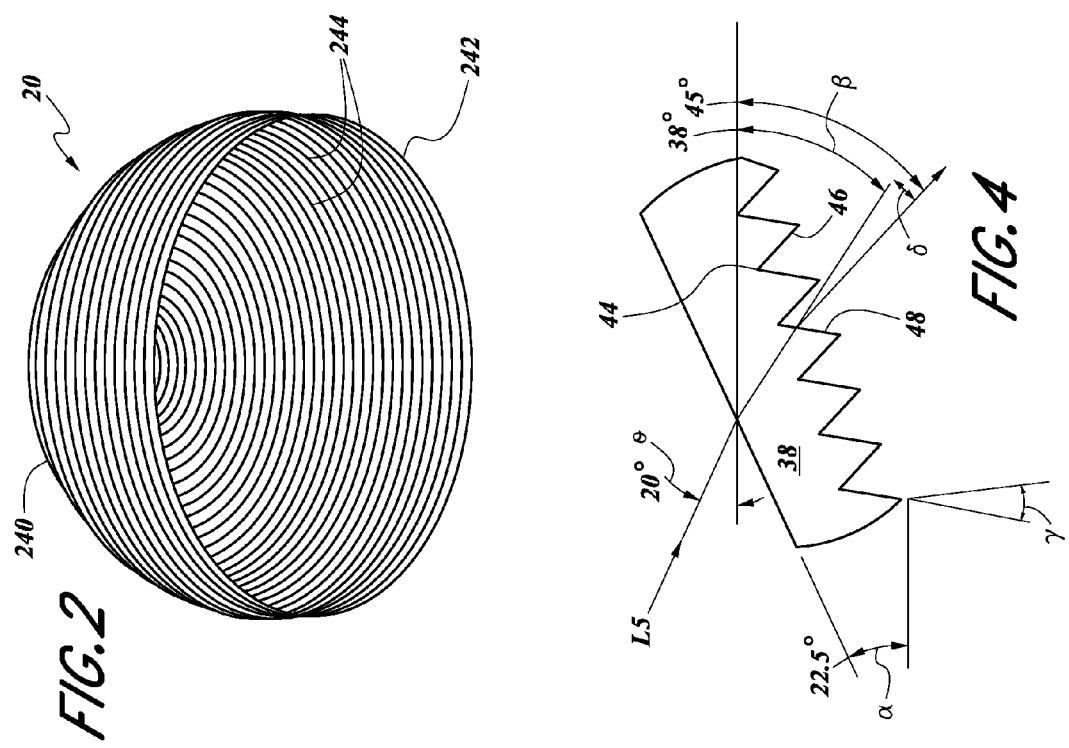

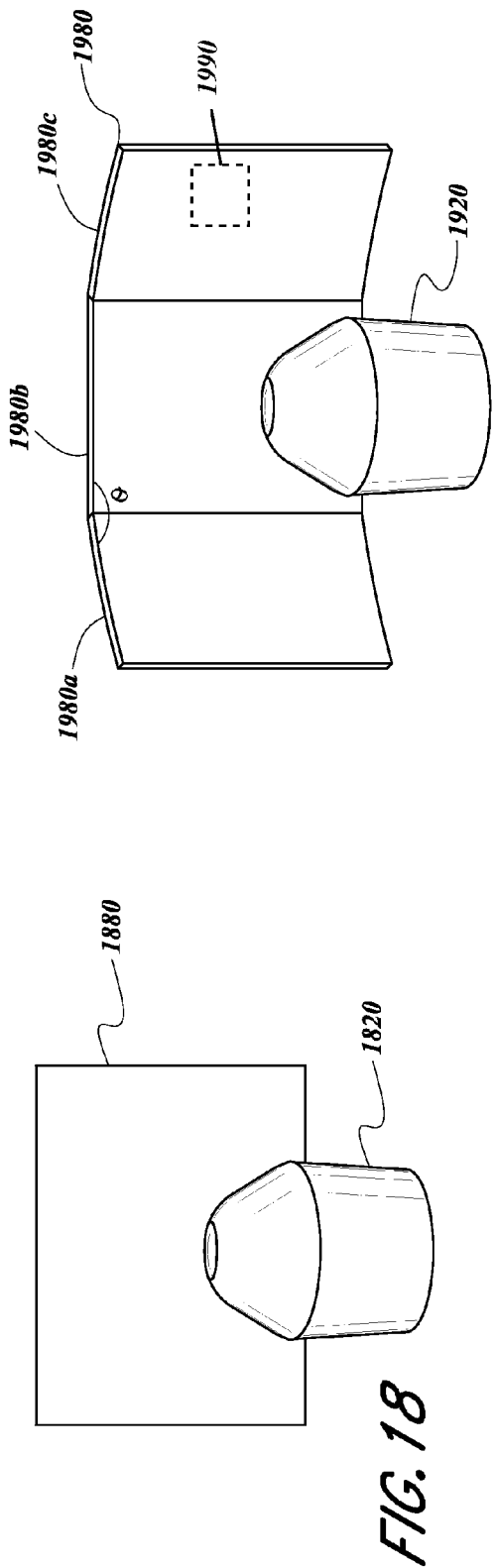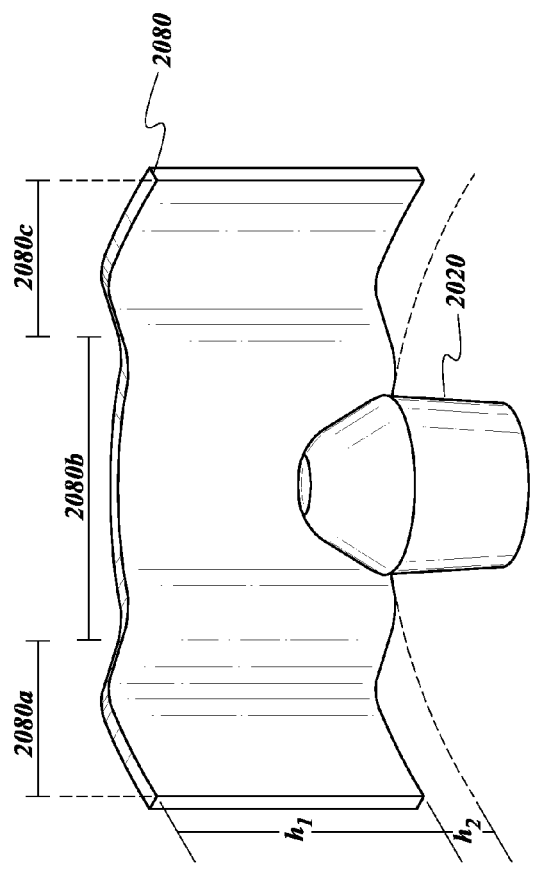

DAYLIGHT COLLECTION SYSTEMS AND METHODS

RELATED APPLICATION

This application claims the benefit under 35 U.S.C. §119 (e) of U.S. Provisional Patent Application No. 61/565,402, titled REFLECTIVE DAYLIGHT COLLECTOR, filed Nov. 30, 2011, the entire contents of which are incorporated by reference herein and made a part of this specification.

BACKGROUND

1. Field

This disclosure relates generally to light collectors and light collection methods used in daylighting.

2. Description of Related Art

Daylighting systems typically include windows, openings, and/or surfaces that provide natural light to the interior of a building. Examples of daylighting systems include skylights and tubular daylighting device (TDD) installations. In a TDD installation, a transparent cover can be mounted on a roof of a building or in another suitable location. TDDs can have various configurations. For example, an internally reflective tube can connect the cover to a diffuser mounted in a room or area to be illuminated. Natural light entering the cover on the roof can propagate through the tube and reach the diffuser, which disperses the natural light throughout a room or area inside of the building. Various devices and methods exist for receiving daylight into a TDD. Certain currently known devices and methods for receiving daylight into a TDD suffer from various drawbacks.

SUMMARY

Lighting devices and methods for illuminating the interior of a building with natural daylight are disclosed. In some embodiments, a daylighting apparatus includes a tube having a sidewall with a reflective interior surface, an at least partially transparent light collector with one or more light turning elements, and a light reflector positioned to reflect daylight into the light collector. The one or more light turning elements can turn direct and indirect daylight into the tube so that it is available to illuminate the building. In some embodiments, the tube is disposed between the light collector and a diffuser positioned inside a target area of a building. In certain embodiments, the tube is configured to direct at least a portion of the daylight transmitted through the light collector towards the diffuser.

Some embodiments disclosed herein include lighting devices and methods that collect a large quantity of natural light substantially throughout the daytime hours of generally sunny days. An exterior daylight collector can direct the natural light into a light guide that is disposed between the daylight collector and a diffuser or light aperture located inside of a building. The light guide can direct the natural light to the diffuser or aperture, and the natural light can provide a substantial amount of illumination to the interior of the building.

In some embodiments, a tubular daylighting device includes a light collector, a generally vertical reflective tube extending from the general area of the light collector, and a diffuser disposed at the opposite end or region of the reflective tube. The light collector permits exterior light, such as natural light, to enter the interior of the reflective tube. The tube guides the exterior light down to the diffuser, which disperses the light generally throughout a target room or area in the interior of a building. The light collector can have one or more components. For example, the light collector can include a transparent top cover, a prismatic top cover, other prismatic elements, one or more light turning assemblies, a durable cover, one or more reflective surfaces (e.g., positioned inside or outside of the collector), other optical elements, other components, or a combination of components. At least some components of the light collector can be configured to be positioned on the roof of a building or in another suitable area outside of the building.

In some embodiments, a daylighting apparatus is configured to direct natural daylight into an interior of a building. The apparatus can include an at least partially transparent light-collecting assembly comprising a substantially vertical sidewall portion and a horizontal collector base aperture; a reflector positioned and configured to reflect natural daylight towards the substantially vertical sidewall portion; and a light turning assembly positioned and configured to turn light transmitted through the at least partially transparent light-collecting assembly towards the collector base aperture. The daylighting apparatus can be configured to provide natural illumination to the interior of the building when the daylighting apparatus is installed on a roof of the building and when the daylighting aperture is aligned with an opening formed in a roof of the building.

The reflector can be curved in one or more dimensions, can be planar, or can have a combination of curved and/or planar sections. The reflector can have a plurality of segments. The reflector can be supported by one or more support legs configured to raise a lower edge of the reflector a substantial distance above a roof of the building when the reflector is installed on the building.

In some embodiments, the reflector includes one or more optical elements configured to alter an angle of reflection of at least a portion of the light that strikes the reflector. The one or more optical elements can include a prismatic element, such as a prismatic film. The reflector can include a first portion having a first prismatic element, and a second portion having a second prismatic element. The first prismatic element and second prismatic element can have different light-turning characteristics.

In certain embodiments, the reflector is configured to tilt forward and/or backward. The reflector can be substantially parabolically-shaped along at least one axis of curvature. The reflector can be positioned such that a cross-sectional center of the light-collecting assembly is positioned at a focus point of the reflector.

In some embodiments, the reflector is configured to rotate about a first axis of rotation. The first axis of rotation can be located substantially at the center of the light-collecting assembly. The reflector can also be configured to rotate about at least a second axis of rotation. The reflector can be configured to automatically rotate to substantially track a solar azimuth angle. The tracking system can rotate the reflector such that it tracks the solar azimuth angle within 5° or within another suitable tolerance.

The light turning assembly of a daylighting apparatus can include a prismatic element, a reflective element, another optical element, or a combination of optical elements. In some embodiments, the light-collecting assembly includes a vertical portion and a top cover portion. At least one of the vertical portion or the top cover portion can include a prismatic element. For example, a prismatic film can be disposed within the vertical portion of the light-collecting assembly. The top cover portion can include a plurality of segments, each of which has a different outside surface angle, or can include a single exterior segment having a substantially unvarying slope. The top cover portion can include a single exterior segment having a substantially varying slope.

Certain embodiments provide a method of directing natural daylight into an interior of a building. The method can include positioning a reflector outside of a light-collecting apparatus disposed over a horizontal daylighting aperture formed in a building envelope and reflecting natural daylight using the reflector towards a substantially vertical sidewall of the light-collecting apparatus. The substantially vertical sidewall can be at least partially transparent. The method can include transmitting the reflected natural daylight through the substantially vertical sidewall of the light-collecting apparatus and turning the reflected natural daylight towards the daylighting aperture such that a substantial portion of the reflected natural daylight is available for illuminating the interior of the building.

In some embodiments, the method can include automatically repositioning the reflector such that an apex of the reflector generally tracks a solar azimuth angle during daylight hours.

In certain embodiments, a daylighting apparatus is configured to provide natural light to the interior of a building. The apparatus can include a transparent light-collecting assembly and a reflector configured to reflect natural light towards the light-collecting assembly. The reflector can be substantially parabolically-shaped and include at least a vertex portion.

Some embodiments provide a method of providing light to an interior of a building. The method can include positioning a reflector outside of a light-collecting apparatus positioned over a daylighting aperture formed in a building envelope. The reflector can be substantially parabolically-shaped and include at least a vertex portion. The method can include reflecting natural daylight using the reflector towards the light-collecting apparatus; transmitting the reflected natural daylight through a transparent sidewall of the light-collecting apparatus; and turning the reflected natural daylight towards the daylighting aperture such that a substantial portion of the reflected natural daylight is available for illuminating the interior of the building. In certain embodiments, the method includes moving the reflector to track a solar azimuth angle.

In certain embodiments, a daylighting apparatus is configured to provide natural daylight to the interior of a building. The apparatus can include a daylight collector defining a daylighting aperture configured to be positioned substantially horizontally or substantially parallel to a plane of a roof of the building surface when the daylighting apparatus is installed on the building; a reflector having a substantially parabolic shape, the reflector configured to reflect daylight such that a substantial portion of reflected daylight is directed towards the daylight collector; and a light turning optical element configured to turn reflected daylight transmitted through the daylight collector towards the daylighting aperture.

The daylighting apparatus can include a tracking system configured to turn the reflector such that an apex of the reflector generally tracks a solar azimuth angle during daylight hours. The reflector can be configured to reflect daylight into the daylighting aperture such that reflected daylight is directed through a surface extending upwardly from at least half of a perimeter of the daylighting aperture. The surface can extend upwardly from at least about 58% of the perimeter of the daylighting aperture. The reflector can have a luminous reflectance greater than or equal to about 99% when measured with respect to CIE Illuminant $D_{65}$. The light turning optical element can include a prismatic film positioned to refract light passing through the daylight collector. The light turning optical element can include a reflector positioned to reflect light passing through the daylight collector.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or element can be removed or omitted. Throughout the drawings, reference numbers may be reused to indicate correspondence between reference elements.

FIG. 2 is a perspective view of a dome-shaped light collector.

FIG. 3 is a cross-sectional view of a dome-shaped light collector.

FIG. 4 is a partial cross-sectional view of the dome-shaped light collector of FIG. 3 having a prismatic element.

FIG. 5 is another partial cross-sectional view of the dome-shaped light collector of FIG. 3 having a prismatic element.

FIG. 18 is a perspective view of a light collection system comprising a planar reflector.

FIG. 19 is a perspective view of a light collection system comprising a reflector having a plurality of panels.

FIG. 20 is a perspective view of a light collection system comprising a reflector having raised peripheral portions.

DETAILED DESCRIPTION OF PREFERRED EMBODIMENTS

Figure 1:
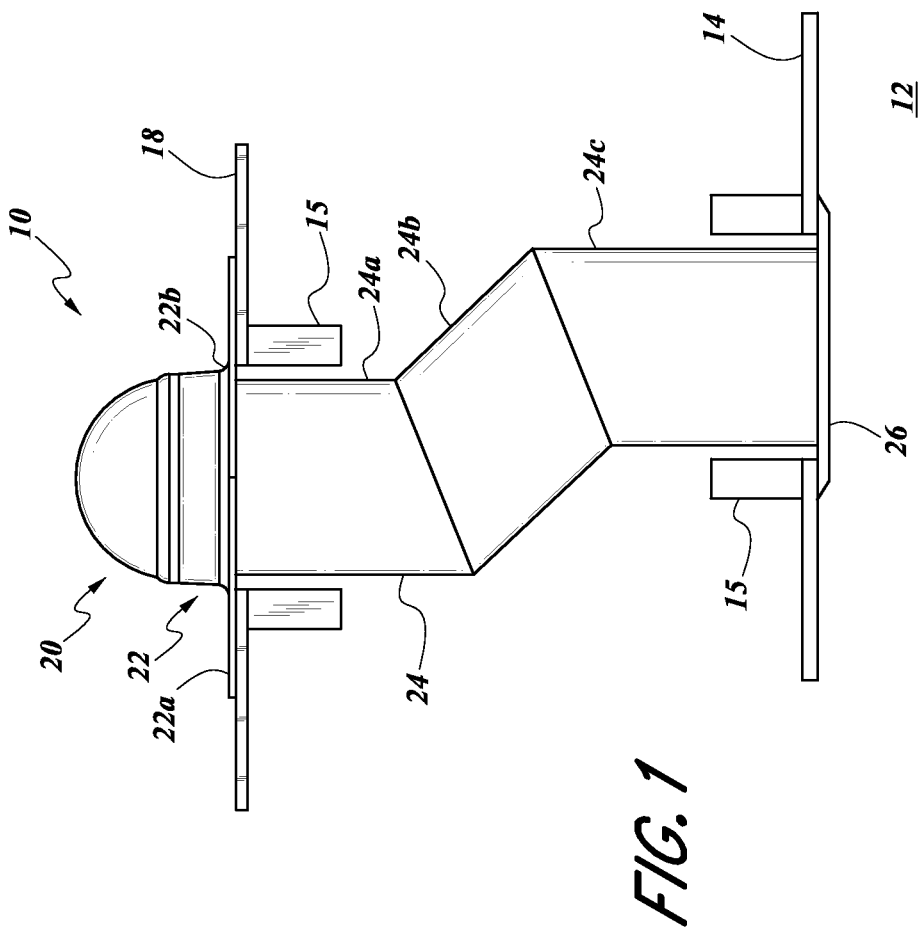
FIG. 1 is a cross-sectional view of a TDD installation.

Although certain preferred embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in a manner or order that may be helpful in understanding certain embodiments; however, the order of description should not be construed to imply that these operations are order-dependent. Additionally, the assemblies, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

In some embodiments, tubular daylighting devices include a light collector, a generally vertical reflective tube extending from the general area of the light collector, and a diffuser disposed at the opposite end or region of the reflective tube. The light collector permits exterior light, such as natural light, to enter the interior of the reflective tube. The tube guides the exterior light down to the diffuser, which disperses the light generally throughout a target room or area in the interior of a building. The light collector can have one or more components. For example, the light collector can include a transparent dome, a prismatic dome, other prismatic elements, one or more light turning assemblies, a durable cover, one or more reflective surfaces (e.g., positioned inside or outside of the collector), other optical elements, other components, or a combination of components. At least some components of the light collector can be configured to be positioned on the roof of a building or in another suitable area outside the building.

A daylighting device can include an optical collimator configured to turn light propagating through the daylighting device such that, when light (such as, for example, daylight, auxiliary light, or daylight and auxiliary light) exits the daylighting device and/or enters a diffuser, the light has increased alignment, as compared to a device without a collimator. In some embodiments, a substantial portion of light propagating through a daylighting device may propagate within the daylighting device at relatively low angles of elevation from a horizontal plane of reference. Such angles of propagation may, in some situations, cause the light to have undesirable properties when it exits the daylighting device. For example, the optical efficiency of a diffuser substantially positioned within a horizontal plane can be substantially reduced when light is incident on the diffuser at low angles of elevation from the horizontal plane. As another example, light that is incident on the diffuser at low angles of elevation can result in light exiting the daylighting device at an exit angle of greater than or equal to about 45 degrees from vertical. Light exiting a daylighting device at those angles can create glare and visibility issues in the area or room being illuminated.

A collimator apparatus can be configured such that light that would otherwise enter the diffuser at undesirable angles is turned to a more desirable angle. For example, the collimator or light aligning apparatus can ensure that light passing through the daylighting device will exit the daylighting device at an exit angle of less than or equal to about 45 degrees from vertical, or at a substantially or nearly vertical orientation, when the diffuser is horizontal. In some embodiments, the collimator or light aligning apparatus can ensure that light passing through the daylighting device will exit the daylighting device at an exit angle of less than or equal to about 45 degrees from a longitudinal axis of the daylighting device or a portion of the daylighting device, or at an orientation substantially or nearly parallel to the longitudinal axis of the daylighting device or a portion of the daylighting device. In certain embodiments, the collimator apparatus is configured to reduce or prevent the light from exiting the daylighting device at an angle of between about 45 degrees and about 60 degrees from vertical. In this manner, the collimator apparatus can reduce or eliminate the glare and visibility issues that light exiting a lighting fixture between those angles can cause.

The daylighting device can include an auxiliary lighting system. For example, the auxiliary lighting system can be inserted into the tube to provide light from the tube to a target area or room when sunlight is not available in sufficient quantity to provide a desired level of interior lighting. In some embodiments, tubular daylighting devices in which the lighting fixture is suspended from a rod or wire may suffer from various drawbacks. For example, the rod, or other apparatus for supporting the lamp, and the lamp itself may occupy a substantial portion of the tube interior, thereby reducing the performance of the tubular daylighting device. If a lighting apparatus is attached to a fixture such as a rod or wire in the center of the tube, and especially if the lighting apparatus has a heat exchanger attached to its back side, a large amount of daylight can be blocked from continuing down the tube.

In some cases, a lighting apparatus typically illuminates in a pattern that allows nearly half of the generated light to be lost back up the tube. Moreover, in some cases, only a portion of the light from the lamp enters the tube base diffuser at an incident angle that provides high transmission efficiencies. When the incident angle of light on the diffuser is high, a greater portion of light can be reflected back up the tube by the diffuser. This effect, together with the light lost up the tube due to the illumination pattern of the lamp, can result in a substantial portion of light from the lamp not reaching the targeted area. Also, in some cases, if the lighting apparatus is facing towards the diffuser, it can create a very bright spot of light that may require further diffusion to eliminate glare and reduce contrast.

Some daylighting devices and methods can incorporate an auxiliary lighting system that is connected to, or used in connection with, a collimator to achieve desirable illumination properties. In some embodiments, the collimator is configured to increase the collimation of both natural light and light emanating from one or more auxiliary light sources. Certain embodiments are configured to provide a desirable distribution and level of illumination within a target area or room under a wide range of natural light conditions. Examples of providing a desirable distribution and level of illumination include providing a substantially even distribution of interior light using any combination of natural light and artificial light, providing a substantially steady level of illumination during daytime or nighttime, providing a distribution of interior light that does not change substantially between daytime and nighttime, providing at least a threshold level of illumination, or any combination of such features.

In some embodiments, a daylighting device is configured to provide greater than or equal to about 400 lumens, greater than or equal to about 450 lumens, greater than or equal to about 500 lumens, greater than or equal to about 1000 lumens, greater than or equal to about 2000 lumens, greater than or equal to about 3000 lumens, or another suitable level of illumination during daytime or nighttime. In certain embodiments, a daylighting device is configured to provide direct illumination of surfaces substantially throughout a room of greater than or equal to about 1 lumen, 2 lumens, 3 lumens, 4 lumens, or 5 lumens per square foot, greater than or equal to about 1 lumen per square foot and/or less than or equal to about 15 lumens per square foot, between about 1 lumen and about 10 lumens per square foot, between about 3 lumens and about 10 lumens per square foot, or within another suitable range. In some embodiments, a daylighting device is configured to provide illumination such that the difference between the greatest level of illumination and the least level of illumination of surfaces that receive direct illumination from the daylighting device is less than or equal to a threshold level. In certain embodiments, the threshold level of differing illumination level for directly illuminated surfaces is about 5 lumens, 4 lumens, 3 lumens, 2 lumens, or 1 lumen per square foot.

The term "collimator" is used herein according to its broad and ordinary sense, and includes, for example, light-aligning assemblies having one or more sidewalls with a reflective interior surface configured such that the exit angle of the light reflected by the collimator is closer to parallel to a longitudinal axis of the tube (e.g., closer to vertical) than the entrance angle of the light. In some embodiments, a collimator increases the elevation angle from a reference plane perpendicular to a longitudinal axis of the tube (e.g., from horizontal) of at least a portion of the light propagating through the daylighting device such that the at least a portion of the light exits the daylighting device at a more vertical angle. The degree to which the light is turned can depend on the orientation and position of the portion of the one or more reflective interior surfaces on which the light is incident.

Some embodiments disclosed herein provide a daylighting apparatus including a tube having a sidewall with a reflective interior surface, a collimating assembly, and an auxiliary light fixture. The tube can be disposed between a transparent cover positioned to receive daylight and a diffuser positioned inside a target area of a building. In certain embodiments, the tube is configured to direct the daylight transmitted through the transparent cover towards the diffuser. The auxiliary light fixture can include a lamp disposed within the tube and a light control surface configured to reflect light exiting the lamp towards the diffuser and to transmit daylight propagating through the tube from the direction of the transparent cover. The lamp can be disposed on the interior sidewall of the tube or otherwise positioned in a way that permits light generated by the lamp to pass into the interior of the tube.

As used herein, "tube" is used in its broad and ordinary sense. For example, a tube includes any conduit, channel, duct, guide, chamber, pipe, pathway or passageway, regardless of cross-sectional shape or configuration, and such terms may be used interchangeably, where appropriate. For example, a tube may be generally cylindrical in shape, or may have a rectangular, oval, triangular, circular, or another cross-sectional shape or combination of cross-sectional shapes. Furthermore, references to tubes or tubular assemblies may refer to assemblies having any suitable length, width or height.

FIG. 1 shows a cross-sectional view of an example of a tubular daylighting device 10 installed in a building for illuminating, with natural light, an interior room 12 of a building. Certain embodiments of daylighting devices disclosed herein may be particularly suited for high bay applications. For example, daylighting devices as described herein may be suited for installation in buildings with an interior ceiling approximately 20 feet high, or higher. The tubular daylighting device 10 includes a transparent light collector 20 mounted on a roof 18 of the building that allows natural light to enter a tube 24. The light collector 20 can be mounted to the roof 18 using a flashing 22. The flashing 22 can include a flange 22a that is attached to the roof 18, and a curb 22b that rises upwardly from the flange 22a and may be angled as appropriate for the cant of the roof 18 to engage and hold the light collector 20 in a generally vertically upright orientation. The roof 18 and/or ceiling 14 may be supported by one or more joists 15.

In certain embodiments, the light collector 20 is at least partially transparent and may be made of any suitable material, e.g., acrylic, polycarbonate, plastic, glass, etc. The light collector 20 may include one or more optical elements for bending, turning, converging, diverging, or otherwise altering the path of light entering the light collector.

The tube 24 can be configured in a generally vertical orientation, spanning the area between the roof 18 and the ceiling 14 of the interior of room 12. In certain embodiments, the tube 24 is connected to the flashing 22. The tube 24 can direct light that enters the tube 24 generally downwardly to a light diffuser 26, which disperses the light in the room 12. The tube 24 can be made of metal, fiber, plastic, a rigid material, an alloy, another appropriate material, or a combination of materials. For example, the body of the tube 24 can be constructed from type 1150 alloy aluminum. The interior of the tube 24 may be reflective. For example, the interior of the tube 24 may be rendered reflective by means of, e.g., electroplating, anodizing, metalized plastic film coating, or other suitable means. In certain embodiments, the tube assembly 24 is rendered internally reflective by laminating the inside surface of the tube assembly with a multi-ply polymeric daylighting film made by the 3M Company of Maplewood, Minn., USA. Other suitable reflective materials can be used to cause the interior surface of the tube 24 to be highly reflective of visible light.

The tube 24 can terminate at a light diffuser 26. The light diffuser 26 can include one or more devices that spread out or scatter light in a suitable manner. In some embodiments, the diffuser 26 absorbs relatively little or no visible light and transmits most or all incident visible light, at least at certain angles of incidence. The diffuser can include one or more lenses, ground glass, holographic diffusers, or any other suitable diffusers. The diffuser 26 can be connected to the tube 24 using any suitable connection technique. For example, a seal ring can be surroundingly engaged with the tube 24 and connected to the light diffuser 26 to hold the diffuser 26 onto the end of the tube 24.

The amount of light that enters the tube 24 through the light collector 20 may at least partly depend on the effective area of the tube aperture with respect to the suns radiation, as well as the intensity of the sunlight. Both of these parameters may be substantially reduced in the early morning and/or late afternoon relative to mid-day levels. With respect to certain TDD embodiments, this may result in substantial variations of interior illumination throughout the day, which may require supplemental lighting in the morning/evening and/or shading at certain times during mid-day. In certain embodiments, optical elements are utilized in connection with a TDD in order to increase the amount of sunlight captured by the TDD during morning and/or evening hours, or time during which the Sun is at a relatively low solar altitude.

The tube 24 may comprise any number of segments or portions. For example, the embodiment depicted in FIG. 1 shows a tube 24 comprising an upper segment 24a, an intermediate segment 24b, and a lower segment 24c. The upper segment 24a may be engaged with the flashing 22 and covered by the light collector 20. The intermediate segment 24b may be contiguous to the upper segment 24a, and may be angled relative thereto. In certain embodiments, the tube 24 comprises multiple intermediate segments. For example, the tube 24 may comprise an upper intermediate segment that is configured to be slidably engaged with a lower intermediate tube segment, thereby allowing for absorption of thermal stresses in the tube 24. The lower segment 24c may be contiguous to the intermediate segment 24c, and may be connected to the tube 24. The one or more segments of the tube 24 may be configured such that the tube 24 provides a desirable pathway between the light collector 20 and the diffuser 26. In certain embodiments, connections, or joints, between contiguous tube segments are covered or sealed with tape or some other means in order to prevent leakage of sunlight propagating through the tube 24.

In order to direct a greater portion of light that strikes the light collector 20 into the tube, optical elements may be incorporated into the light collector to bend or direct sunlight in a direction generally toward the tube aperture. In certain embodiments, the bending of light is accomplished using prisms. The bending of sunlight using prisms can be described by Snell's law of refraction, which sets forth the relationship between the angle of incidence of the daylight on the surface of the light collector 20, and the angle of refraction of the light after passing through the interface between the surface of the light collector 20 and the air, or other substance, surrounding the light collector. The degree to which the collector 20 bends light may depend on a number of factors. For example, the index of refraction of the material or materials with which the collector 20 is constructed affects the angle of refraction. In general, the greater the difference between the index of refraction of the cover and that of the surrounding air, the larger the angle of refraction. Furthermore, the incident angle of the light with respect to the index change interface affects the resulting angle of refraction. In general, the greater the incident angle to the interface, the larger the angle of refraction. Light entering a higher index material will refract toward the normal of the surface of the interface. Conversely, light entering a lower index material will refract away from the normal of the surface of the interface.

The amount of light transmitted through the light collector 20 may be affected by first surface reflection losses, in the case of light entering a larger index material, and total internal reflection losses, in the case of light entering a lower index material.

The various parameters described above influence the amount and direction of light that passes through the collector 20 and into the tube 24. In certain embodiments, light collector 20 is configured to optimize the amount of light collected, as well as the direction of light propagation into the tube 24.

In certain embodiments, the tubular daylighting device 10 includes a thermal insulation subsystem (not shown), or portion, that substantially inhibits thermal communication between the interior 12 of a building and the outside environment 13. The thermal insulation subsystem can have any suitable configuration, such as, for example, any configuration or combination of configurations discloses in U.S. Patent Application Publication No. 2011/0289869, the entire contents of which are incorporated by reference herein and made a part of this specification.

The tubular daylighting device may also include a thermal break in any materials or components of the daylight device that have high thermal conductivity. For example, a spacer or gap in the sidewall of the tube 24 can be positioned near a thermal insulating portion and the thermal insulating portion and thermal break can be configured to form a substantially continuous layer between the building interior 12 and the exterior environment 13. In certain embodiments, the insulating portion and thermal break are disposed in the same plane as other building insulation material, such as fiberglass or the like.

Tables A-D below provide data relating to the performance of four different daylighting device configurations, using two different light collection covers. The first cover, referred to herein as a reflector dome, is a substantially clear dome comprising a reflector affixed thereto on a portion of its inside surface. Such a dome is similar to light collection cover embodiments described in US RE36,496 and/or U.S. Pat. No. 7,322,156, the entire contents of which are incorporated by reference herein and made a part of this specification. The second cover is a prismatic cylinder dome, which is described in greater detail below. The parameters measured include performance, solar heat gain ("SHGC"), and interior heat loss ("U-Factor"). The various daylighting device configurations represented in Tables A-D include open ceiling designs with insulation at the roof level, as well as light diffusers, such as the Optiview™ diffuser, manufactured by Solatube International, Inc. of Vista, Calif., USA. Performance of the various configurations can be measured with respect to sunlight at varying solar altitudes. Specifically, the performance of each TDD configuration can be measured with respect to solar altitudes of 30° and 40°.

Table A provides performance data for a daylighting device configuration comprising a straight tube with a single diffuser at its base and no thermal break or gap. As is demonstrated by the data, such a configuration may provide increased light spread and reduced efficiencies at relatively low solar altitudes. The performance data in Table A, as well as performance data in subsequent tables discussed below, are presented in terms of relative units of luminous flux with respect to an arbitrary base value, rather than in terms of the SI derived unit, lumens. This is done in order to highlight the relative performance of the various embodiments described herein. Luminous flux performance data can be obtained with the use of a goniophotometer.

TABLE A

| Parameters | Reflector Dome | Prismatic Cylinder Dome |
| --- | --- | --- |
| Performance @ 30° | 1.0 units luminous flux | 1.43 units |
| @ 40° | 1.35 units | 1.54 units |
| SHGC | .37/250 Btu/hr | .26/175 Btu/hr |
| U-Factor (Btu/hr-sf-° F.) | 1.27/245 Btu/hr | Same |

Table B provides performance data for a TDD configuration comprising a collimator with a single diffuser at the base of the tube with a single diffuser at its base and no thermal break or gap. As is demonstrated by the data, such a configuration may provide reduced light spread and higher efficiencies at relatively low solar altitudes.

TABLE B

| Parameters | Reflector Dome | Prismatic Cylinder Dome |
| --- | --- | --- |
| Performance @ 30° | 1.0 units luminous flux | 1.42 units |
| @ 40° | 1.35 units | 1.36 units |
| SHGC | .37/250 Btu/hr | .26/175 Btu/hr |
| U-Factor (Btu/hr-sf-° F.) | 1.27/245 Btu/hr | Same |

Table C provides performance data for a TDD configuration comprising a collimator with a diffuser thermal break at the level of roof insulation. Such a thermal break can include clear and/or beaded glazings, which are supported and separated by a rigid insulating material (e.g., plastic component) with a seal.

TABLE C

| Parameters | Reflector Dome | Prismatic Cylinder Dome |
| --- | --- | --- |
| Performance @ 30° | 1.0 units luminous flux | 1.43 units |
| @ 40° | 1.40 units | 1.59 units |
| SHGC | .31/210 Btu/hr | .21/140 Btu/hr |
| U-Factor (Btu/hr-sf-° F.) | .35/67 Btu/hr | Same |

Table D provides performance data for a TDD configuration comprising a collimator with a diffuser "honeycomb" thermal break at the level of roof insulation. Such a thermal break comprises clear and beaded glazings with honeycomb, which are supported and separated by a plastic component with a seal.

TABLE D

| Parameters | Reflector Dome | Prismatic Cylinder Dome |
|---|---|---|
| Performance @ 30° | 1.0 units luminous flux | 1.43 units |
| @ 40° | 1.39 units | 1.59 units |
| SHGC | .30/200 Btu/hr | .20/130 Btu/hr |
| U-Factor (Btu/hr-sf-° F.) | .16/30 Btu/hr | Same |

The tables above show that the prismatic cylinder dome may provide an increase in performance and reduction in solar heat gain over reflector dome embodiments. Furthermore, configurations including a thermal break may significantly reduce solar heat gain and interior heat loss when compared to certain alternative configurations. The configurations considered above with respect to Tables A-D may be combined with, or incorporate, certain other features, components, or embodiments of daylighting systems as described herein, which may affect the performance values measured above.

FIG. 2 illustrates an embodiment of the light collector 20 shown in FIG. 1. In certain embodiments, the light collector 20 is configured to turn at least a portion of the light striking its surface such that the light is directed downwardly toward a horizontal aperture of the tube 24. Various features and characteristics of the light collector 20 affect the light turning properties of the collector. As disclosed in U.S. Pat. No. 7,546,709, the entire contents of which are incorporated by reference herein and made a part of this specification, a light collector comprising a smooth outside curved surface in combination with internal prisms may produce desirable light-turning effects. In certain embodiments, such a configuration provides a double refraction of the sunlight incident on the outside surface of the cover.

The light collector 20 may form any suitable shape and/or size. For example, light collector 20 may be generally cylindrically-shaped, with a flat or curved top portion. In certain embodiments, such as that shown in FIG. 2, the light collector 20 may be generally hemispherically-shaped. The collector of FIG. 2 defines a closed apex 240 and an open, generally circular base 242 opposite the apex 240. While the base 242 shown in FIG. 2 is circular, in certain embodiments, it may be elliptical, rectangular, or multi-sided, or any other suitable shape, or combination of shapes. The collector 20 may be configured to have a continuous curved shape or a series of curved and/or flat sides segments.

FIG. 2 depicts a prismatic pattern formed on the collector 20. Such a pattern may be, for example, molded into the inside and/or outside surface of the collector 20. In certain embodiments, a prismatic film, or other prismatic element, is adhered to, connected to, or otherwise associated with the collector 20. As set forth in greater detail below, in certain embodiments, the prisms can be established by circular grooves 244 that are parallel to the base 242 and that are defined by opposed faces that may have a flat or curved cross-sectional shape. Furthermore, as disclosed further below, the grooves 244 can vary in depth and pitch and/or in other respects. The grooves 244 may circumscribe the entire circumference of the collector 20, and may be substantially uniform throughout the height of the cover and around its entire circumference. In certain embodiments, the grooves 244 vary with respect to one or more parameters at different heights or points along the circumference of the collector 20. For example, the groves 244 may comprise faces of varying angles, shapes, and/or widths, depending on height and/or position. In certain embodiments, portions of the collector 20 do not include a prismatic element. While the grooves 244 are shown oriented as generally horizontal lines, a portion, all, or substantially all of the grooves 244 may be oriented at any suitable nonzero angle with respect to horizontal, or otherwise.

As shown in FIG. 3, the diameter of the collector 20 at the base 224 may be greater than the diameter of the tube 24 at a horizontal aperture. For example, the diameter of the collector 20 at the base 224 may range from 100% to 150% or more of the tube outer diameter. Furthermore, the collector height, h, may range from 26% or less of the tube diameter to 100% or more of the tube diameter.

The collector 20 may be formed with a variable prism that directs low-angle light into the skylight tube 24 and that reflects away at least a portion of higher-angle light. Such a configuration may achieve a more constant light output over the course of the day. In certain embodiments, grooves nearer the apex 240 of the cover have different characteristics than grooves 244 nearer to the base 242. For example, FIGS. 4 and 5 provide cross-sectional views of embodiments of prismatic grooves located in portions of the collector 20 near the apex 240 and the base 240, respectively.

Grooves 244 may be defined by opposing faces (46, 48 with respect to FIG. 4, and opposing faces 50, 52 with respect to FIG. 5.) As shown in FIGS. 4-5, the angle of the pitch of the collector 20 (i.e., the angle between a line tangent to the curve of the collector and a horizontal plane) at each of the respective regions is labeled "α." In certain embodiments, the pitch of the collector 20 is less at a point near the apex 240 of the collector than it is at a point closer to the base 242 of the collector. Therefore, when the material out of which the collector 20 is constructed has a constant index of refraction throughout, light striking the cover may be turned to a greater degree towards the tube in the region detailed in FIG. 4 than the region detailed in FIG. 5.

Light $L_S$ strikes the surface of the cover 20 at a solar altitude angle θ (e.g., 20° as shown in FIGS. 4-5). Therefore, the angle of incidence at which the light strikes the collector 20 is equal to 90°−(θ+α). In a case where θ=20° and α=22.5°, as shown in FIG. 4, the angle of incidence would be 47.5°. In certain embodiments, the material of the cover 20 at the interface between the cover and the surrounding air has a greater index of refraction than the air. Therefore, at least a portion of the light is refracted towards the normal of the surface by some amount, depending on the angle of incidence as well as the difference in indexes of refraction at the interface. In FIGS. 4-5, the angle of the refracted light after passing through outside air/cover interface with respect to a horizontal plane (i.e., non-prism refraction) is represented by "β." The light further propagates through the wall of the collector 20 until it strikes a prism wall. In certain embodiments where the index of refraction of the cover is greater than that of the air or other material contained within the collector, light passing through the collector 20 will be refracted away from the normal of the prism surface. Prisms on the inside surface of the collector 20 may be designed to further turn light towards a horizontal aperture of the tube 24. The angle between the prism face 48, 50 and a vertical axis of the tube is represented by "γ." The additional angle of refraction experienced by light $L_S$ as it crosses the prism interface 48, 50 is represented by "δ." Sunlight $L_S$ entering the collector 20 may therefore experience double refraction as it passes through two interfaces of the cover, thereby potentially allowing for increased light-turning capability of the cover. As shown in FIG. 4, sunlight $L_S$ strikes the surface of the collector at a solar altitude of 20°, at which point it is refracted downward by, for example, 18°. The light $L_S$ then strikes prism face 48, at which point it is again refracted downward by, for example, an additional 7°. Therefore, after undergoing double refraction, light that enters the collector at a 20° angle with respect to a horizontal plane, may be directed towards the tube at, for example, 45° from horizontal, or some other angle, depending on the configuration of the collector (e.g., the configuration of any prisms used in the light turning assembly).

As depicted in FIG. 5, α may be greater at point nearer to the base 242 than at a higher point. It may be desirable for cover 20 to be configured such that light entering the collector at a point nearer to the apex 240 (e.g., point "A") is turned to a greater degree than light entering the collector at a point farther from the apex (e.g., point "B") in order to direct such light into a vertically oriented tube 24. Table E below provides the total direction change of light passing through the top cover 20 for certain embodiments, as described below and illustrated in FIGS. 4-5. (Note: angles are referenced from horizontal unless otherwise noted).

In certain embodiments, the collector assembly 620 is symmetrical, providing a 360-degree sunlight capture zone. The effective light capture area of the collector assembly 620 can be an area of the collector directly exposed to rays of sunlight, plus the portion of the surface area of the top cover that is directly exposed to the sunlight. In certain embodiments, in the presence of unobstructed, substantially collimated light, the effective capture area of the collector may be approximately 90 degrees of the 360 degree perimeter of the collector, or approximately 25% of the total surface area of the collector. In certain embodiments, a prismatic film 648 with outwardly-facing prisms 656 runs along the inside of at least a portion 650 of the lower region 651 of the collector 620. In certain embodiments, sunlight may refract down into the tube if the sunlight is within approximately +/−45 degrees incident angle to the surface of the collector. Because the entire sunlight capture zone encompasses the full 360 degree perimeter, only 90 degrees, or 25%, of the available area might be utilized in the presence of clear, collimated sunlight.

In some embodiments, the top cover portion 638 is made integrally with the vertical portion 636 and may extend from

TABLE E

| Cover Section | Exterior surface angle "α" of cover (degrees) | Light angle "β" after non-prism refraction through cover outer surface (degrees) | Prism angle "γ" (from vertical) of lower prism face (degrees) | Add'l refraction "δ" through prism face (degrees) | Total direction change of light (degrees) |
|---|---|---|---|---|---|
| A (FIG. 5) | 61 | 23 (3° refraction) | 10 | 4 | 7 |
| B (FIG. 4) | 22.5 | 38 (18° refraction) | 20 | 7 | 25 |

In certain embodiments of dome-shaped covers such as that depicted in FIGS. 2-3, all or substantially all the low angle sunlight (e.g., light with a solar altitude angle of approximately 20°) entering the upper portion of the cover, i.e., at point "A," enters the tube, thereby increasing the effective aperture of the tube. Absent the prismatic element illustrated in FIGS. 2-3, at least a portion of light that would otherwise be reflected downward into the tube 24 may exit the cover 20 without entering the tube.

Figure 6:
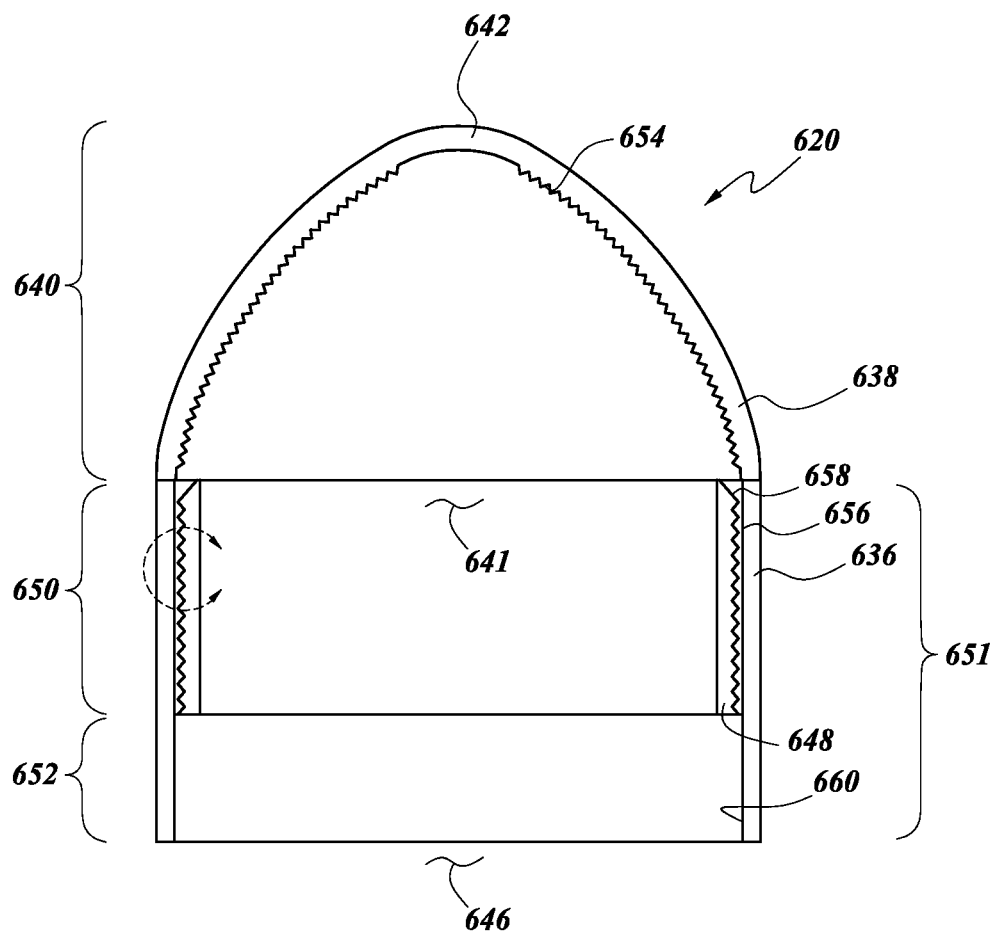
FIG. 6 is a cross-sectional view of a light-collecting assembly having vertical and top cover portions.

The dome-shaped light collector illustrated in FIGS. 2-3 may have reduced vertical sunlight capture area when compared with certain alternative light-collecting assembly configurations. For example, U.S. Patent Application Publication No 2010/0325979, the entire contents of which are incorporated by reference herein and made a part of this specification, discloses a light collector with top cover and vertical sidewall portions. A light collecting assembly incorporating top and vertical collector portions can increase vertical sunlight capture area by providing a large vertical target area for sunlight capture. FIG. 6 shows a cross-sectional view of a light-collecting assembly comprising both a vertical portion 636, which spans a lower region 651 and a top cover portion 638, occupying an upper region 640. In certain embodiments, a prismatic film is disposed inside and/or outside of the vertical portion 636 to provide double refraction of light. For example, as illustrated in FIG. 6, the prismatic film 648 may include prisms 656 facing outward to provide a first refraction of light and a plane surface of the sheet providing a second refraction. In certain embodiments, this prismatic pattern is molded into a thin polymer sheet that can be placed inside of a protective transparent cover. In certain embodiments, prisms are formed in the outside or inside surface of collector 636. A top cover portion 638, such as, for example, the prismatic cover shown in FIG. 2, can be disposed above the vertical portion 636.

an open base 641 to a closed apex 642 distanced from the open base 641, forming a continuous wall. The top cover portion 638 may be spherical, hemispherical, planar, curved, or may have some other closed form, such as a pyramid, cone, or any other suitable shape. The vertical portion 636 may be hollow, and may extend from the open base 641 of the dome 638 down, terminating in an open lower end 646, through which light can pass.

As depicted in FIG. 6, the light collector 620 can include one or more prismatic films 648, which can circumscribe an axial segment 650 of the vertical portion 651. Prismatic film 648 may be a single unitary member, or may comprise multiple distinct segments. In certain embodiments that include a prismatic film 648, the prismatic film 648 may span the entire vertical portion 651 of the light collector 620. Alternatively, as shown in FIG. 6 the prism ring 648 may span a first axial segment 650 of the vertical portion 651, but not span a second axial segment 652 that is contiguous to the first axial segment 50.

The top cover portion 638 may be formed with prismatic elements, generally designated 654, which may be prism lines that are etched in, molded in, or otherwise integrated with or attached to the top cover portion 638. In certain embodiments, the prism elements increase light throughput by capturing light originating outside the collector 620 and turning it downward through the open periphery 641, past the vertical portion 651, and into a tube assembly. The prism lines 654 may be oriented parallel to a horizontal plane, and may entirely circumscribe the top cover portion 638 in concentric circles. Example embodiments of prism lines 654 are described in more detail below.

In certain embodiments, sheet 648 may include prisms, generally designated 656, configured to refract light. Prisms 656 may comprise prism grooves on an outer surface 658 of the prismatic film 648, and may be linear when the sheet is in a flat configuration and, thus, form curved sections when the sheet 648 is shaped into the configuration illustrated in FIG. 6. The outer surface 658 of the prismatic film 648 may be positioned against, or proximate to, an inner surface 660 of the axial segment 650 of the vertical portion 636. The prism grooves 656 may be outwardly facing, as shown in FIG. 6, or otherwise configured. In certain embodiments, prisms 656 are similar to the prism elements in embodiments of the top cover portion 638 in that they capture light from outside the collector 620 and turn it downward into a tube assembly, thereby increasing light throughput.

In certain embodiments, the prisms 654 associated with the top cover portion 638 are similar to embodiments of prisms associated with the dome described above with respect to FIG. 2. For example, the prism elements 654 may have varying prism angles depending on what portion of the dome they are associated with. In certain embodiments, the prism elements 654 have uniform prism angles throughout the top cover portion 638.

Figure 7:
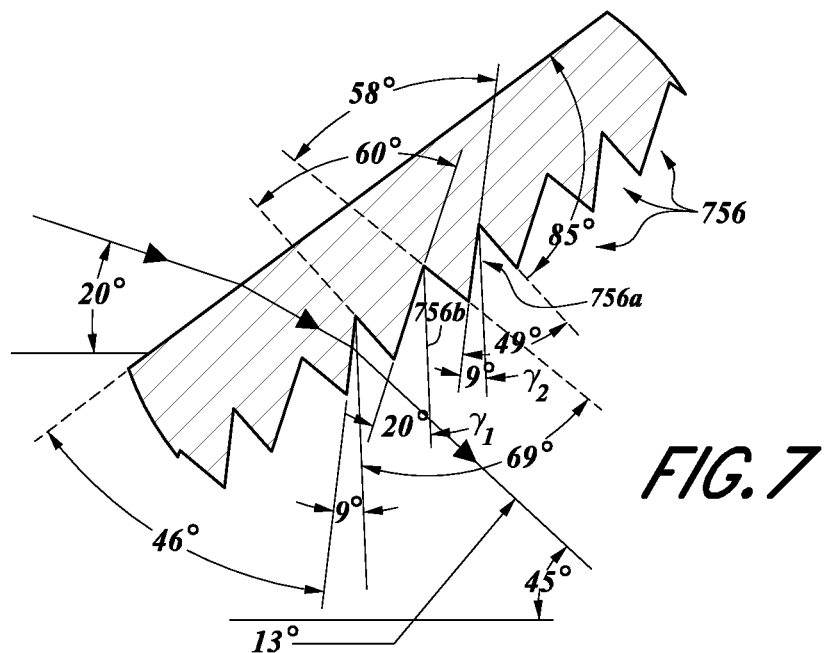
FIG. 7 is a cross-sectional view of a light-collecting top cover portion.

In certain embodiments, prisms within the same portion of the top cover 640 or vertical portion 651 have varying prism angles. FIG. 7 illustrates a cross-sectional view of a segment of a transparent dome having a plurality of prisms 756. In certain embodiments, the prism angles of prisms 756 may vary relative to one another. For example, $\gamma_1$ (e.g., 20°) which represents the prism angle of prism 756b, is different than $\gamma_2$ (e.g., 9°), which represents the prism angle of prism 756a. It may be desirable for adjacent prisms, or adjacent groups of prisms, to comprise different prism angles in order to mix the light that propagates through a light collector. For example, if substantially collimated light enters a prismatic portion of a light collecting assembly that comprises prisms with equal prism angles, light entering the tube may be concentrated in certain regions. Such light concentration may cause undesirable "hot spots" in the destination area. By varying the prism angles, the effect of such hot spots may be reduced.

Figure 8:
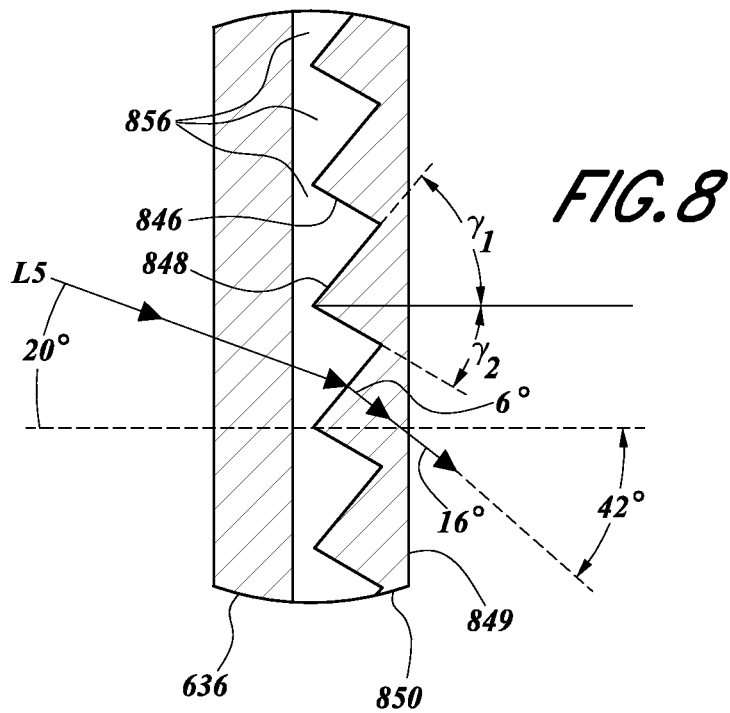
FIG. 8 is a cross-sectional view of a light-collecting vertical portion.

FIG. 8 provides a cross-sectional view of a portion 848 of the prismatic film 648 shown in FIG. 6. The portion 848 of the prismatic film 648 shown in FIG. 8 comprises a plurality of prisms 856. The assembly shown in FIG. 8 comprises an outer transparent vertical portion 636 of the light-collecting assembly 620 of FIG. 6. The prisms 856 may be positioned along the interior surface 660 of the transparent vertical portion 636, and may face the direction of sunlight $L_S$ penetrating the vertical portion 636. In certain embodiments, prisms 856 are inwardly facing, with back surface 849 lining, or proximate to, outer vertical portion 636. In certain embodiments, prismatic film 848 contains prisms on more than one of its sides. The prisms may be configured to turn at least a portion of sunlight that strikes the vertical portion of the light collecting assembly downward towards a horizontal aperture of a tube.

In certain embodiments, prisms 856 include two faces 846, 848. In the embodiment of FIG. 8, face 848 has a prism angle $\gamma_1$ with respect to horizontal (e.g., 50°), while face 846 has a prism angle $\gamma_2$ below horizontal (e.g., 30°). Prism angles $\gamma_1$ and $\gamma_2$ may be equal, or may vary, depending on the configuration of prismatic film 850. Furthermore, similarly to prisms 756 described above, adjacent prisms 856, or groups of prisms, may have varying prism angles. Such varying prism angles may promote mixing of light propagating through a light collector. In certain embodiments prismatic film 850 comprises prisms having uniform prism angles.

With further reference to FIG. 6, prism angles of the dome 638 and the prismatic film 648 may be designed to provide an incident angle to the Sun that increases or maximizes the range of solar altitude radiation that may be captured and turned toward the aperture 646 at the base of the light-collecting assembly 620. In certain embodiments, the dome 638 and prismatic film 648 are comprised of the same material or materials, or materials having substantially similar indexes of refraction. In certain embodiments, the prismatic film 648 can comprise a material or materials with higher index of refraction than the dome 638.

The vertical portion 636 may be configured to capture relatively low angle sunlight, such as, for example, sunlight at a solar altitude of around 20°. In certain embodiments, the vertical portion 651 has an aspect ratio (vertical height to horizontal aperture) of greater than approximately 0.91. Increased height of the vertical portion 651 may advantageously increase the effective capture area of the horizontal aperture 646 during times of relatively low solar altitude, thereby providing increased sunlight during the morning and late afternoon/early evening hours. In addition to increasing the effective aperture of a skylight at low solar elevations, the vertical portion 636 may also be configured to reduce the effective capture area of the horizontal aperture 646 at higher sun angles to prevent over illumination and/or heating during midday hours.

Table F, below, provides refracted angles of light that is refracted using a light turning assembly with two different prism angles. Each of the rows of the table is associated with sunlight at a different solar altitude, as identified in the first column. The second and third columns provide the refracted angle of light (measured from horizontal) after the light passes through the respective portion of the prismatic element. In some embodiments, light enters a light collector assembly that includes two or more prism angles (e.g., 50° and 70°). Daylight will not pass through the prismatic element when the incident angle of light on the prismatic surface (e.g., as determined by the solar altitude, the orientation of the prismatic element, the angle of any reflector that directs light towards the prismatic element, and/or and the prism angle of the prismatic element) exceeds the critical angle of total internal reflection ("TIR"). When TIR occurs, substantially none of the light incident on that portion of the prismatic element enters the light collection assembly. When a reflector is used to direct daylight towards the prismatic element, the angle(s) of the prismatic element can be selected to increase or maximize the amount of direct and indirect (e.g., reflected) daylight that is directed into a tube aperture.

TABLE F

| Solar Altitude (degrees) | Angle of Refracted Light (Prism Angle of 50°) | Angle of Refracted Light (Prism Angle of 70°) |
| --- | --- | --- |
| 20 | 42° | 31° |
| 30 | 55° | 42° |
| 40 | 74° | 55° |
| 50 | TIR | 72° |
| 60 | TIR | TIR |

The top of a light collecting assembly can be clear or prismatic. A prismatic top cover portion can have a prismatic element having a single prism angle or multiple prism angles. A clear top cover application may be beneficial in highly diffuse climates due to relatively high transmission of overhead sunlight. In certain embodiments, at least a portion of the top cover portion 638 may be configured to reflect some or all of the light striking such portion at solar altitudes above a certain angle. For example, a portion of the dome at or near the apex 642 may be configured to reflect at least a portion of overhead sunlight in order to reduce light and/or heat during midday hours.

The vertical portion 636 may comprise any suitable shape or combination of shapes. For example, the portion 636 of light-collecting assembly 620 may have a square, circular, elliptical, triangular, hexagonal, or otherwise shaped base. Furthermore, the walls of the portion 636 may be substantially vertical, or may have any desired inward or outward slope. In certain embodiments, the walls of vertical portion 636 are sloped to allow for nesting of multiple such components for tighter packaging.

In certain embodiments, the vertical portion 636 provides a substantially vertical target area for sunlight collection, which may provide higher aspect ratios for light collection. Prismatic elements may be integrated with at least a portion of the wall of the vertical portion 636. In alternative to, or in addition to, prisms integrated in the vertical portion 636, the above-described prismatic film may be used to refract light downward. The planar back side 849 of the prismatic film, shown in FIG. 8, may provide good downward refraction due to a high to low index of refraction interface. In certain embodiments comprising a plastic polymer with an index of refraction in the range of approximately 1.49-1.65, the vertical portion of the collector can have an aspect ratio of height to width that is greater than or equal to 0.9. In some embodiments, the vertical portion's aspect ratio of height to width is greater than or equal to 1 or greater than or equal to 1.1.

Table G, below, provides computer simulation data comparing the performance of a conventional 21-inch diameter clear dome light collecting assembly to that of an embodiment of a cylinder-dome light collecting assembly having a height of 23 inches, constructed according to principles disclosed herein. The table provides the amount of light (in relative units of luminous flux) collected by each of the respective assemblies at various solar altitudes. These performance values include the associated direct solar illuminance at each solar altitude. These values can be obtained using the procedures set forth by the Illuminating Engineering Society of North America (IESNA), which are documented in Section 5.5 of the IESNA 9$^{th}$ Edition Handbook, chapter 8.

TABLE G

| Solar Altitude (degrees) | Clear Dome | Cylinder-Dome |
| --- | --- | --- |
| 20 | 1.0 units luminous flux | 2.02 units |
| 30 | 1.43 units | 2.31 units |
| 40 | 2.02 units | 2.50 units |
| 50 | 2.29 units | 1.86 units |
| 60 | 2.67 units | 1.53 units |
| 70 | 2.92 units | 1.06 units |

Table G demonstrates an increase in light collection at solar altitudes of 40 degrees or less. Therefore, in certain embodiments, cylinder-dome light-collecting assemblies provide increased light collection during periods when conventional light-collecting assemblies fail to capture substantial amounts of light, such as during certain morning and/or evening hours, depending on the time of year and/or latitudinal position. Furthermore, light collection may be reduced during periods when the amount of light sunlight exposure is more than may be desirable, such as during midday periods. In certain embodiments, light collecting assemblies in accordance with embodiments disclosed herein provide for fewer reflections of light as it propagates down a tube because light is turned to more closely align with a longitudinal axis of the tube. Fewer reflections within the tube may decrease losses within the tube. Moreover, light propagating through the tube may reach a diffuser at the base of the tube at smaller incident angles, providing for higher optical transmission efficiencies. In addition, as is demonstrated by Table G, a cylinder-dome configuration may allow for a more uniform supply of illumination throughout the day.

Figure 9:
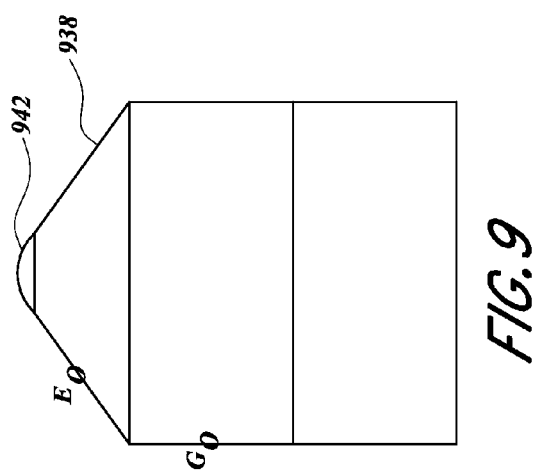
FIG. 9 is a cross-sectional view of a light collector.
Figure 10:
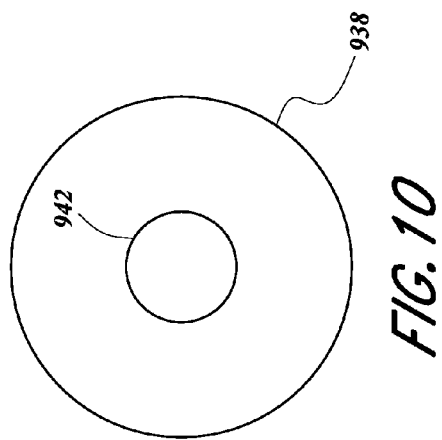
FIG. 10 is a top view of the light collector of FIG. 9.

As discussed above, the top cover portion of a light collector assembly may be substantially hemispherically shaped, as illustrated in FIG. 2, or may be any other suitable shape. The example light collecting assembly in FIG. 9 comprises a conically shaped top cover portion 938. Similarly to some of the embodiments described above, the top cover portion 938 may be integrated with one or more light-turning assemblies, such as prisms, for bending sunlight downward. A top region of the dome 938, such as circular region 942, may be configured to reflect some, all, or substantially all of sunlight at high solar altitudes, thereby decreasing the intensity of light during midday hours. FIG. 10 provides a top view of the conical top cover portion 938 of FIG. 9

Figure 11:
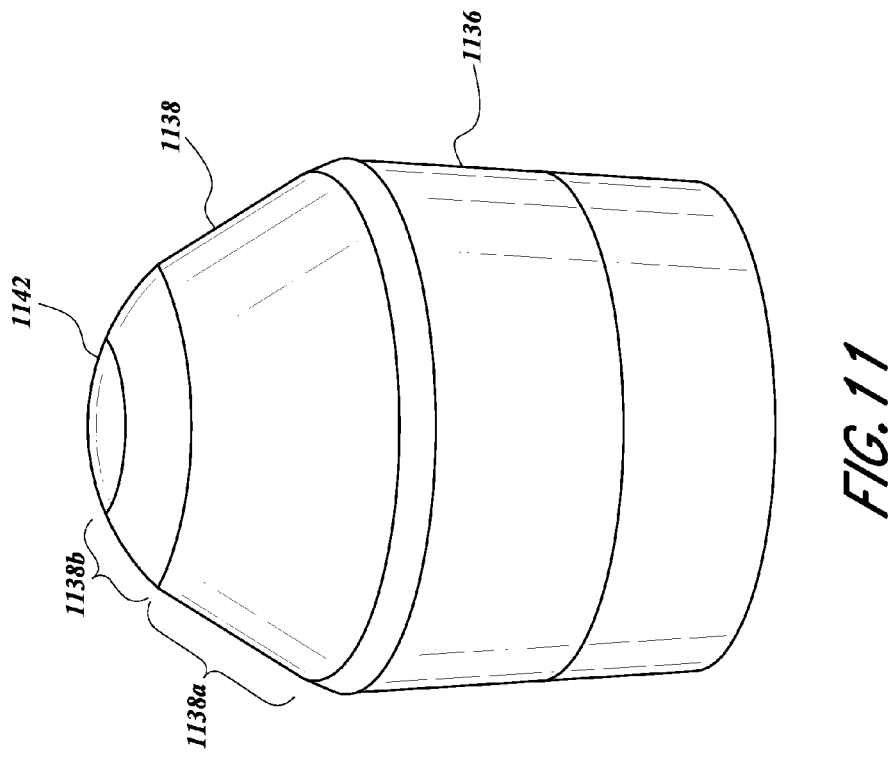
FIG. 11 is a perspective view of a light collector.

FIG. 11 illustrates an embodiment of a light-collecting assembly comprising a top cover portion 1138 including multiple collector segments 1138a, 1138b, 1142. The walls of one or more of the wall segments may be substantially straight, or may be curved to some degree. At least a portion of each of the wall segments 1138a, 1138b can include a light turning element. With respect to the embodiment illustrated in FIG. 11, the walls of collector segments 1138a and 1138b have different surface angles with respect to a horizontal plane. Collector segment 1138b may be configured to bend low angle light to a greater degree than collector segment 1138a. This may be desirable because light striking the top cover portion 1138 at segment 1138b may require a greater change in direction in order to enter the horizontal aperture of the tube below.

Depending on the Sun's altitude and/or azimuth, the effective light capture area of a roof-top collector with respect to direct sunlight may not incorporate a majority of, or at least a portion of, the available surface area of the light collector. For example, with respect to at least low-altitude sunlight, at least a portion of the surface area of a light collector that is opposite the Sun's rays may not capture any direct sunlight. It may therefore be advantageous to expose a greater portion of the total surface area of a light collector to sunlight, whether direct or indirect, in order to increase the light-capturing characteristics of the light collector. One way to accomplish this may be to position a visible light reflective element in such a way as to reflect a portion of sunlight towards the capture area of the light collector. Such a reflective element may be passive or may be configured to track the location of the Sun throughout the day.

Figure 12:
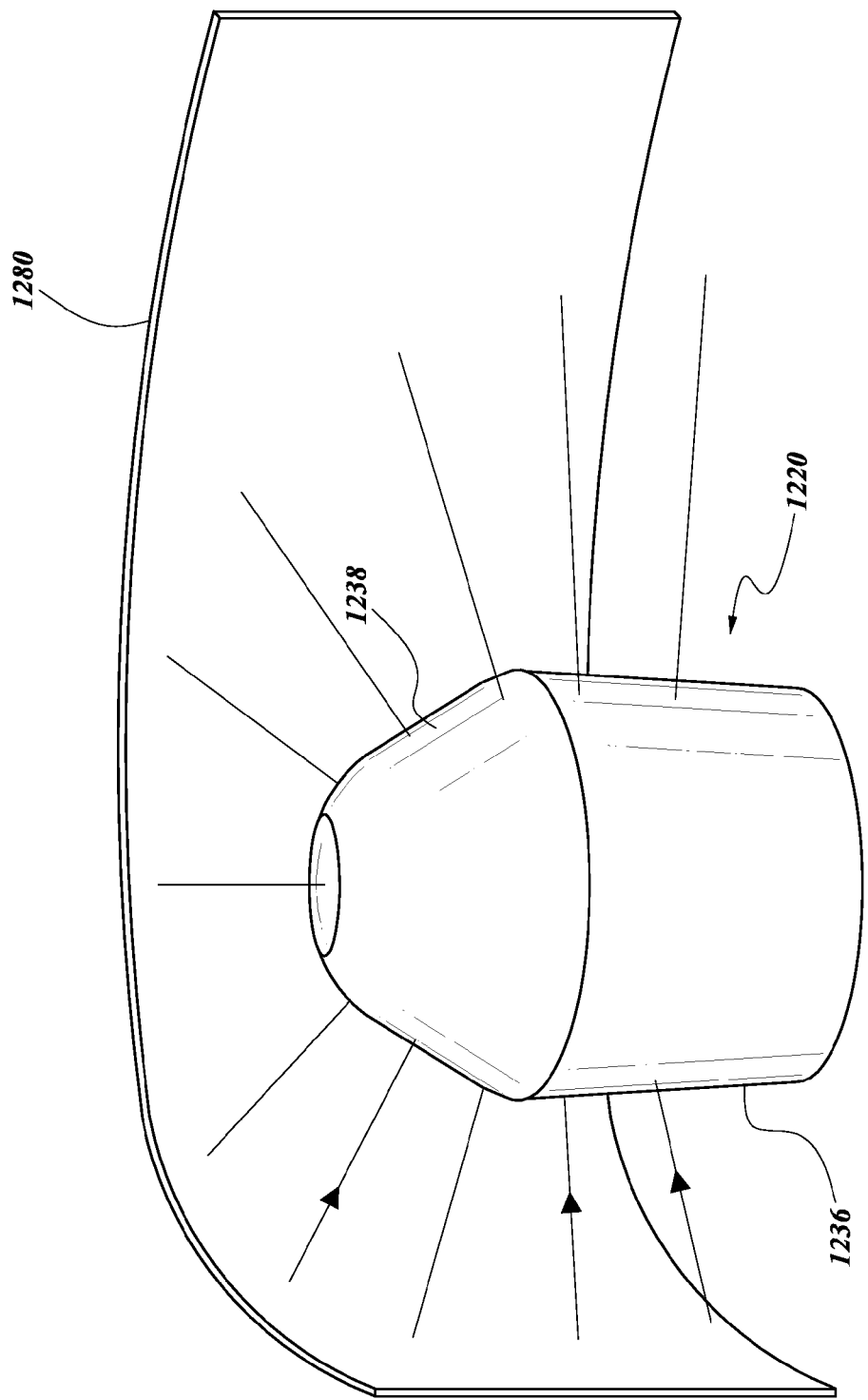
FIG. 12 is a perspective view of a light collection system comprising a reflector.

In certain embodiments, a flat or curved reflective panel is positioned generally behind a light collector. The reflector reflects sunlight onto a vertical target area of a light collector. The vertical target area can be larger than the horizontal aperture of a tube in a skylight application. A light turning system connected to the light collector can turn the light downward towards a collector base aperture and into the tube. The light turning system can include a prismatic element, a refractive element, a reflective element, other optical elements, or a combination of optical elements. FIG. 12 provides a perspective view of an embodiment of a sunlight-collection system comprising a light reflector 1280 positioned in proximity to a light collector 1220. The reflector 1280 may be positioned any distance from the light collector 1220, and the distance between the reflector 1280 and the light collector 1220 may vary at different points of the reflector 1280.

Figure 13:
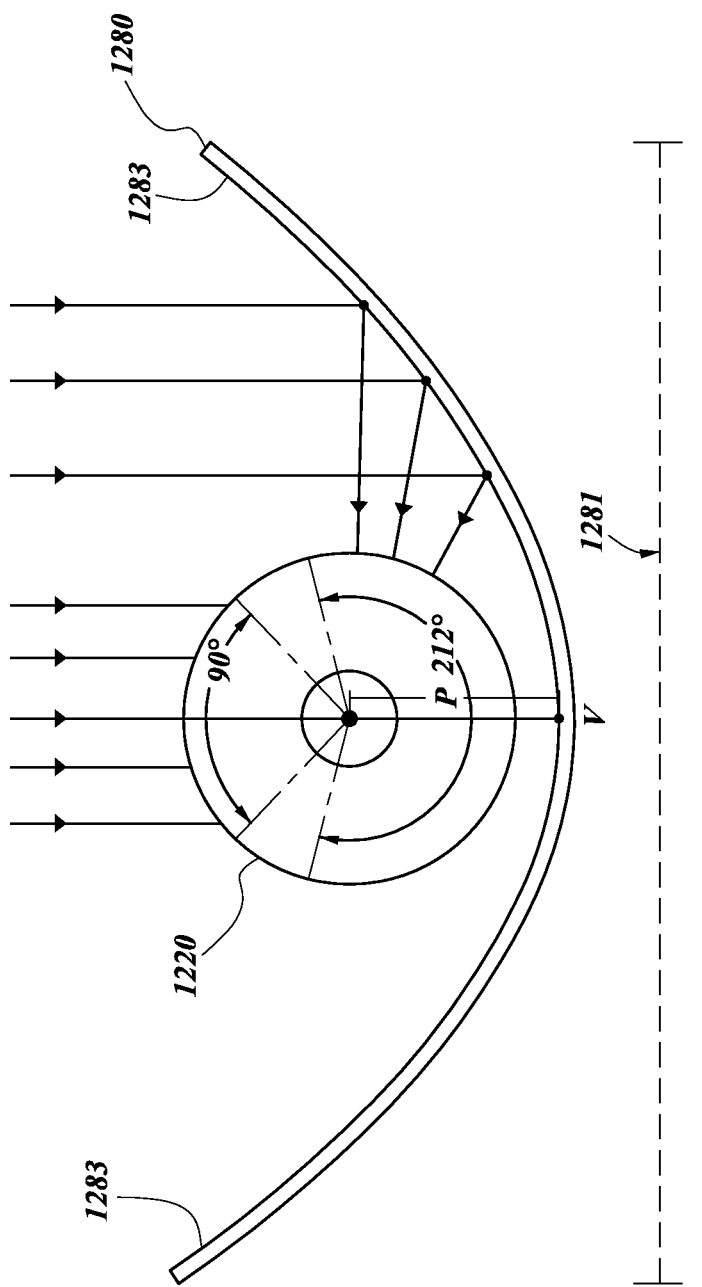
FIG. 13 is a top view of a light collection system comprising a parabolic reflector.

The light collector 1220, similarly to certain embodiments disclosed above, may comprise a vertical portion 1236 and a top cover portion 1238. In certain embodiments, light reflector 1280 is parabolically curved about light collector 1220. As is shown in FIG. 13, which provides a top view of the sunlight collection system of FIG. 12, the parabolic light reflector may be positioned such that the center of light collector 1220 lies on the axis of symmetry of the parabola 1280 at the focus point. Such a configuration may provide increased capture of reflected sunlight by the vertical capture area of the light collector 1220 when the reflector 1280 is positioned such that substantially collimated direct sunlight that strikes the reflector 1280 is substantially parallel, or within an acceptable range of angles relative to parallel, to the axis of symmetry of the parabola 1280. Light striking the parabolic reflector 1280 at any point along its length, or at least over a portion of its length, may be reflected towards the vertical capture area of the light collector 1220.

Reflectors 1280 suitable for use with embodiments of daylighting systems disclosed herein may include the Vega WR 193 and 293 model outdoor environment reflectors, manufactured by Almeco USA Inc. of Atlanta, Ga., USA, and/or the MIRO-SUN weatherproof reflective 90 and weatherproof 85 model reflectors, manufactured by Alanod Westlake Metal Ind. of North Ridgeville, Ohio, USA. Such products may be formed into various shapes, such as parabolas, and may provide excellent solar reflective properties and withstand harsh outdoor environments. In some embodiments, the reflector has a luminous reflectance greater than or equal to about 95%, greater than or equal to about 98%, or greater than or equal to about 99% when measured with respect to CIE Illuminant $D_{65}$.

The light reflector 1280 of FIG. 12 is curved about the light collector 1220. However, as discussed below with respect to the example embodiments of FIGS. 16-18, light reflector 1280 can have any desirable shape or configuration. The reflector 1280 may collect substantially or nearly collimated/parallel sunlight rays and redirect them to a common focal line. The reflector 1280 may be positioned behind the collector with its focal point at or near the center of the collector 1220. Such a configuration may allow for sunlight to be directed to the vertical portion and top cover faces in line with a vertical plane that rotates around the center of the collector 1220. This may increase the sunlight collection area and utilize a greater portion of the total area and/or optics of various lenses in the collector 1220.

The use of a curved reflector 1280 may allow for sunlight capture from a greater range of circumferential angles about the light collector 1220. This increase in angular capture of sunlight may provide a number of benefits, such as increased light mixing. For example, in embodiments in which sunlight enter a tube opening from a wide range of circumferential angles, the distribution of light exiting the tube may be more uniform and may reduce the presence of hot spots on a diffuser at the base of the tube. Such light mixing may also prevent collimated light from reaching the diffuser prisms in such a way as to cause rainbows to appear in the building interior.

With respect to certain embodiments in which light is directed into a central feeder tube, and dispersed into multiple branch tubes, light mixing may be important in promoting the dispersion of sunlight into the various branch tubes. In certain embodiments, branch tubes each receive approximately equal amounts of light from the central feeder tube.

The collection and redirection of sunlight using a light reflector, such as the curved reflector 1280, may substantially increase the performance of a conventional tubular daylighting device. A number of parameters may contribute to increased performance of certain embodiments of sunlight-collection systems. For example, the sunlight collection area of the vertical portion 1236 of light collector 1220 may affect the performance of such a system. In certain embodiments, the height and diameter of the vertical portion 1236 in relation to the diameter of a tube opening into which light is directed may be determined by the refractive turning power of optical elements (e.g., integrated prisms, prismatic film or lens film, etc.) within, or associated with, the cylinder. This aspect ratio of cylinder height to tube diameter may depend on the solar altitude range it is desired to capture and refract into the tube. This range may be from approximately 20 to 70 degrees for most locations in the United States. For example, using lower-end solar altitude of approximately 20 degrees as the design point for refracting light into the tube from the optical elements associated with a vertical-walled cylinder, the cylinder height may be designed to an approximate range of 0.67 to 1.0 times the tube diameter. These values may vary based on material index of refraction and prism angles, among other things.

In some embodiments, a vertical portion 1236 of a light collector has an aspect ratio of cylinder height to tube diameter of approximately 0.67. The effective sunlight collection area of a collector having this configuration can be calculated. The sunlight-capture surface areas of the cylinder with respect to both direct and reflected light are measured in a vertical plane. The parabolic reflector may be positioned substantially vertically parallel to the outside wall of the vertical portion 1236, such that reflected light enters the vertical portion 1236 at an angle of incidence approximately equal to the solar altitude.

As an example, a system may include a collector height of approximately 9.125" and a tube diameter of approximately 13.6". The width of the vertical portion 1236 may be approximately equal to the diameter of the tube opening, or may be larger or smaller than the diameter of the tube. For example, the vertical portion 1236 may have a diameter of approximately 15.6". The actual effective front light-capture area of the cylinder is associated with the direct non-reflected sun, which, in certain embodiments, may be limited to an exposure angle of approximately 90 degrees (a chord width of approximately 11") due to the off axis curvature limitation of the optics in the vertical portion and top cover portion lenses. The effective direct sunlight capture area of the collector is therefore:

$$11"\times 9.125"=100.4 \text{ in}^2.$$

As shown in FIG. 13, in certain embodiments, the reflected sunlight from the parabolic reflector may be designed for a 212 degree (+/−106 degree from the back side of the cylinder) coverage of the collector perimeter, which, according to the specifications described above, has the following reflected sunlight capture area:

$$15.6"\times 3.14\times 9.125"\times(212°/360°=263.2 \text{ in}^2.$$

Figure 14:
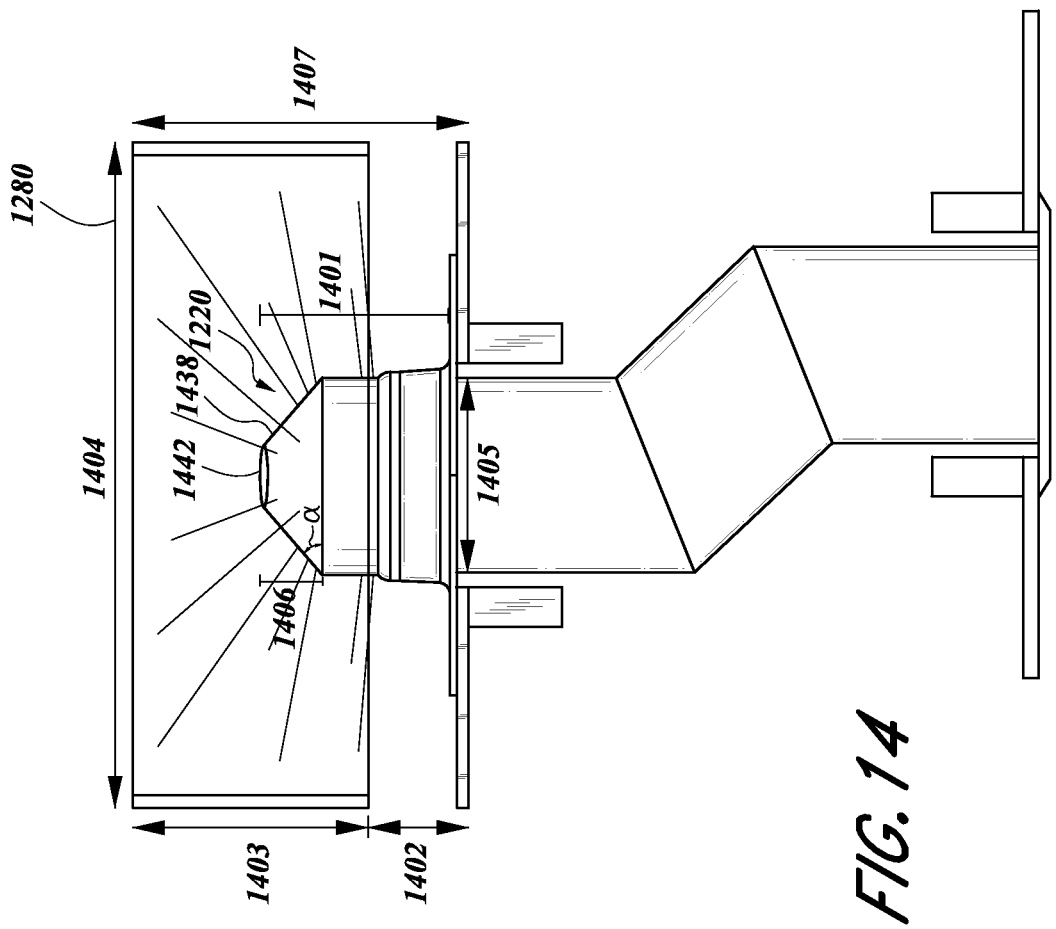
FIG. 14 is a cross-sectional view of a TDD installation.

Referring to FIG. 14, the effective sunlight collection area of the top cover portion 1438 depends on, among possibly other things, the height 1406 of the top cover. The height 1406 of the top cover may be based on the refractive optics required to redirect the sunlight down the height 1401 of the collector to the tube opening. In certain embodiments incorporating a double-refractive optical element from the exterior of the dome and the internal prisms, the height may be determined by the slope α of the dome, prism angles, and/or material index or indices of refraction. In an embodiment comprising a slope α of about 35 degrees from horizontal and a prism riser angle of about 9 degrees from vertical with an included angle of about 58 degrees, the dome may have a height of approximately 5.4 inches. The total area of the dome would be approximately equal to a right circular cone at 35 degrees from horizontal (3.14×7.8"×9.5"=232.7 in$^2$), depending on how closely the dome conformed to the shape of a cone. In certain embodiments, the shape of the dome varies in certain respects from an exact cone. For example, the apex 1442 of the dome may be rounded off, rather than pointed, among other possible variations. In a system in which the surface of the dome facing the sun has an acceptance angle of approximately 90 degrees, the direct sunlight capture area may equal approximately 44.9 in$^2$. The reflected sunlight portion (acceptance angle of 212 degrees) would be approximately 137.0 in$^2$.

Table H summarizes calculated individual and total sunlight collection effective areas in relation to solar altitude. The table includes the effective sunlight collection areas of the cylinder-dome design described above at solar altitudes of 20 to 70 degrees in 10 degree increments. The values in the table take into consideration the cosine difference between the suns solar altitude from horizontal and the incident angle to the plane of the vertical cylinder and the sloped dome. The values in the table provide only potential area for light collection for demonstration, and may not take into account certain losses that may be experienced in lighting systems actually constructed according to the principles disclosed herein, such as material optical transmission losses.

TABLE H

| Solar Altitude (degrees) | Light Incident to Collector Vertical Surface Including Direct + Reflected Sunlight (% direct/total effective area) | Light Incident to Dome Surface Including Direct + Reflected Sunlight (% direct/total effective area) | Total Effective Area for Collector |
| --- | --- | --- | --- |
| 20 | 29/341.6 in$^2$ | 24/147.1 in$^2$ | 510.7 in$^2$ |
| 30 | 27/316.3 in$^2$ | 24/163.3 in$^2$ | 479.6 in$^2$ |
| 40 | 28/278.0 in$^2$ | 24/174.0 in$^2$ | 452.0 in$^2$ |
| 50 | 28/232.7 in$^2$ | 24/179.4 in$^2$ | 412.1 in$^2$ |
| 60 | 28/181.8 in$^2$ | 24/179.4 in$^2$ | 361.2 in$^2$ |
| 70 | 28/123.6 in$^2$ | 24/174.0 in$^2$ | 297.6 in$^2$ |

Table I, below, provides calculations of the collection area of a clear top cover, as opposed to the collector comprising secondary optics described above, using a parabolic reflector. The effective capture area of a horizontal aperture of a tube opening may be calculated using the area of a right circular cone. Similar to the embodiment described above, the horizontal aperture (i.e., the tube opening) may be approximately 13.6" in diameter and have an area of approximately 145 int. The direct sun front area is a factor of the sine of the solar altitude times the horizontal area. The reflected light may again span approximately 212 degrees of the full circumference of the tube aperture. This application may represent the use of the parabolic reflector with only a clear top cover covering the tube opening. With a parabolic reflector vertically oriented, reflected light retains approximately the same solar altitude value as direct sunlight. In embodiments comprising a reflector that is tilted either forward or backward by some amount, reflected light may have a different solar altitude than direct light.

Again, the following table summarizes the individual and total sunlight collection effective area in relation to solar altitude. The values in the table provide only potential area for light collection for demonstration, and may not take into account certain losses that may be experienced in lighting system actually constructed according to the principles disclosed herein, such as material optical transmission losses.

TABLE I

| Solar Altitude (degrees) | Direct Sunlight Incident to the Front of the Horizontal Tube Opening (% available/effective area) | Reflected Sunlight Incident to Horizontal Tube Opening (% available/effective area) | Total Effective Area for a Clear Dome/Horizontal Opening w/Reflector |
| --- | --- | --- | --- |
| 20 | 34/49.4 in$^2$ | 34/90.9 in$^2$ | 140.3 in$^2$ |
| 30 | 50/72.6 in$^2$ | 50/98.7 in$^2$ | 171.3 in$^2$ |
| 40 | 64/92.9 in$^2$ | 64/111.7 in$^2$ | 204.6 in$^2$ |
| 50 | 77/111.8 in$^2$ | 77/133.0 in$^2$ | 249.8 in$^2$ |
| 60 | 87/126.3 in$^2$ | 87/171.0 in$^2$ | 297.3 in$^2$ |
| 70 | 94/136.5 in$^2$ | 94/249.9 in$^2$ | 386.4 in$^2$ |

With further reference to FIG. 13, the effective sunlight collection area of the parabolic reflector 1280 may depend on a number of parameters, such as shape, size, secondary optical elements, etc. In the embodiment depicted in FIG. 13, the shape of the a vertical cross-section of reflector 1280 is based on the standard form equation $y^2=4px$ for a parabola, where p is the focal distance from the vertex, v, and the x–y coordinates provide the shape. In certain embodiments, it may be desirable to locate the vertex near to the outside perimeter of the collector, or as close as practical or possible. In certain embodiments, the center of the collector is positioned at or near focal point of the parabolic reflector 1280. For example, with a collector width of about 15.6", it may be desirable to position the center of the collector at a focal distance of about 9" and configure the reflector 1280 to have an aperture 1281 across the curve of the reflector to the sun of about 48". This configuration may provide the approximately 212 degree coverage of the collector perimeter on which certain calculations above depend.

With reference to the embodiment daylighting system shown in FIG. 14, the collector 1220 may have any suitable height 1401, and such height 1401 may depend on a number of parameters, such as tube aperture diameter, specifications of secondary optics incorporated in or associated with the collector, amount of desired light collection, cost, manufacturing concerns, and/or other parameters. In certain embodiments, the height 1401 of the collector is approximately 14.6", greater than or equal to about 10", greater than or equal to about 14", or another suitable height.

The reflector 1280 may have any suitable height 1403. For example, the height 1403 of the reflector may be substantially equal to the height of the light collector, or may have a height greater than that of the collector to accommodate a range of vertical tilts, as discussed in greater detail below. For example, in an embodiment comprising a 14.6" tall collector, the reflector 1280 may have a height of 16". Furthermore, the reflector may be raised by a certain amount 1402 with respect to a roof top or the base of the light collector 1220. Therefore, the top of the reflector 1280 may be a total distance 1407 above a roof top or the base of the light collector 1220.

Figure 15:
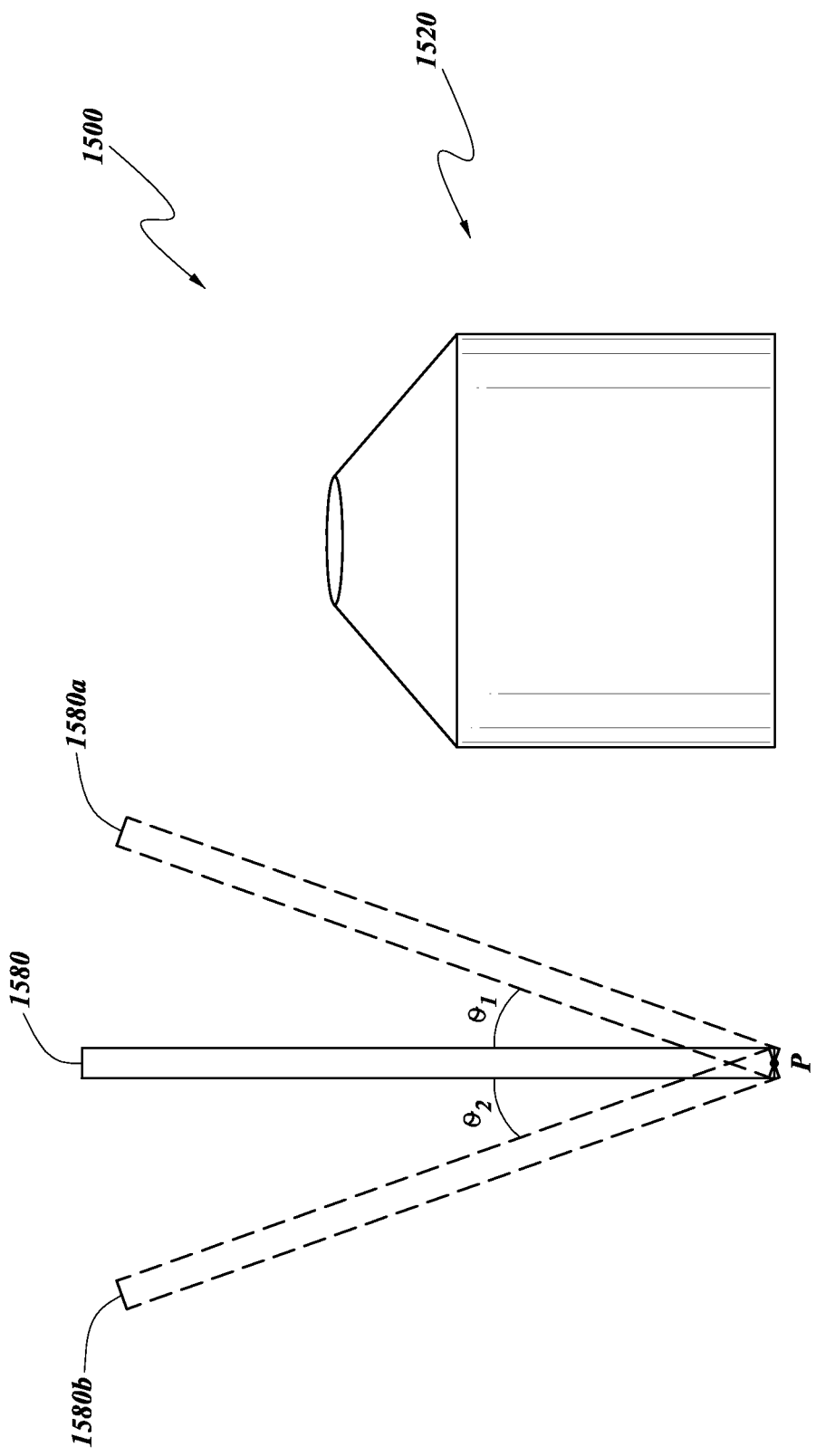
FIG. 15 is a cross-sectional view of a light collection system comprising a reflector.
Figure 17:
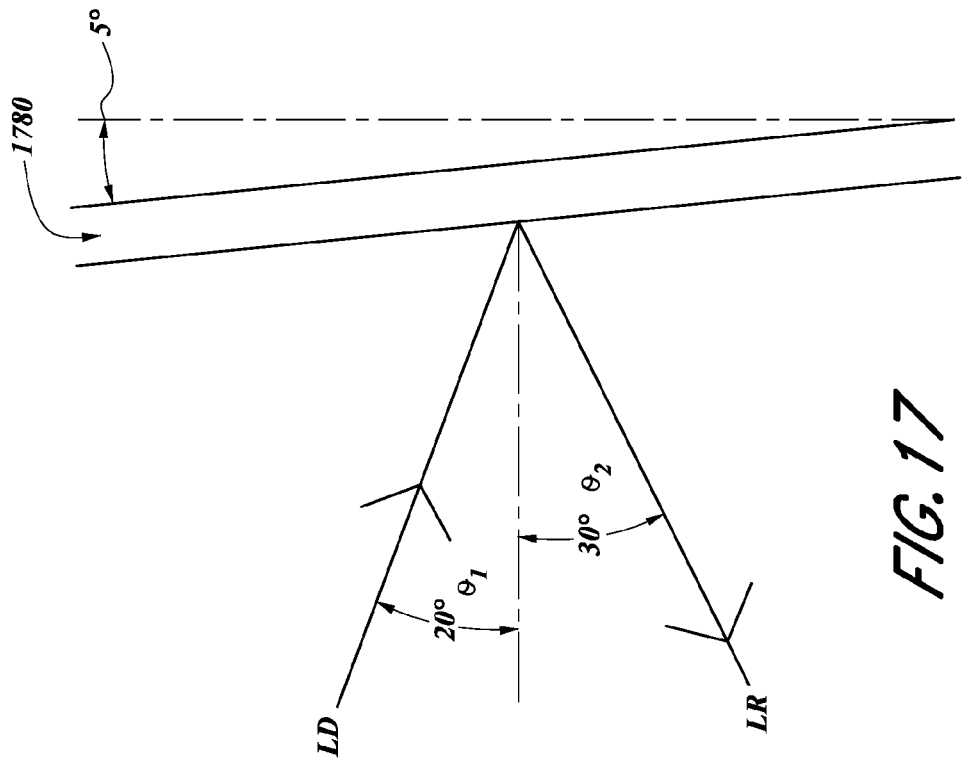
FIG. 17 is a cross-sectional view of a light reflector.
Figure 16:
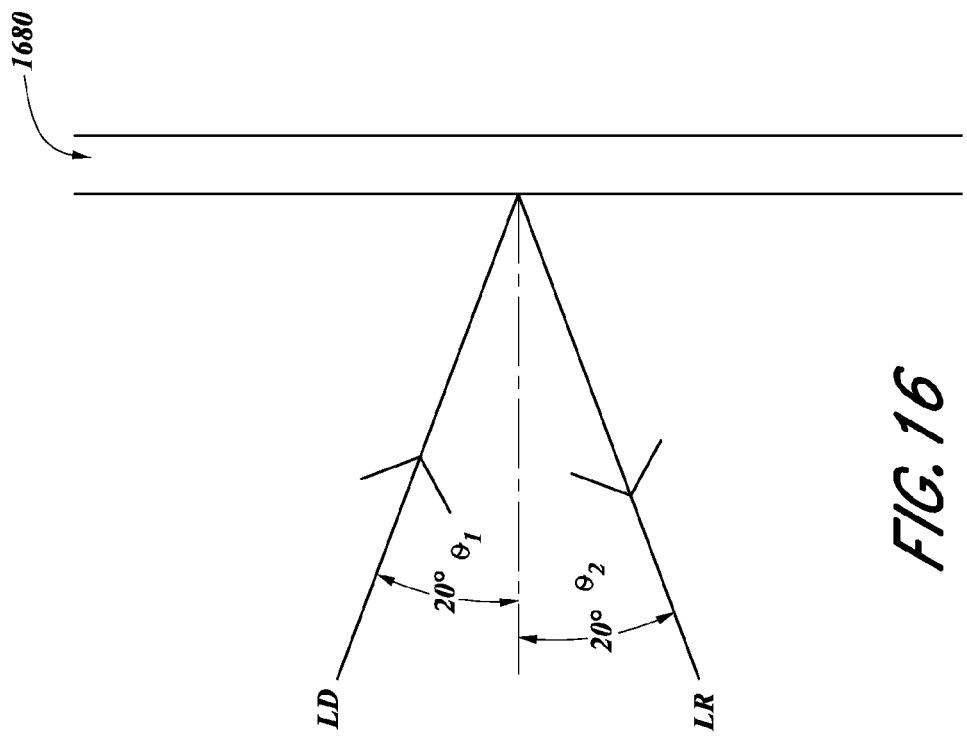
FIG. 16 is a cross-sectional view of a light reflector.

FIG. 16 provides a cross-sectional view of a vertically-oriented planar reflector 1680. As is shown in the figure, the angle $\theta_1$ of direct light $L_D$ with respect to a horizontal plane is generally equal to the angle to the angle $\theta_2$ of reflected light $L_R$. In certain embodiments, it may be desirable to tilt a light reflector about an axis, thereby altering the angle of reflected light. FIG. 15 illustrates an embodiment of a sunlight collection system in which a light reflector 1580 is configured to tilt about a horizontal axis at pivot point p at the base of reflector 1580. While pivot p is located at the base of reflector 1580, the reflector may be configured to tilt or rotate about any suitable point. For example, reflector 1580 may be configured to pivot about at a point approximately midway between the top and base of the reflector. The reflector 1580 may be configured to tilt forward, backward, or both forward and backward. As shown in FIG. 17, which provides a cross-sectional view of a planar reflector 1780 tilted 5° towards the direction of direct light $L_D$, tilting the reflective panel forward will generally change the resultant solar altitude 10 degrees for every 5 degree panel tilt from vertical, and tilting back from vertical will decrease the resultant solar altitude according to the same ratio. Specifically, in the embodiment of FIG. 17, the angle $\theta_2$ of reflected light $L_R$ with respect to a horizontal plane is 10° greater than the angle $\theta_1$ of direct light $L_D$.

Under certain lighting conditions, it may be desirable to tilt reflector 1580 forward in order to direct light downward. For example, FIG. 15 shows reflector 1580a tilted forward by an amount $\theta_1$. During times of low solar altitude, such as morning or evening hours, it may be desirable to tilt the reflector 1580a forward in order to capture an increased amount of sunlight in light collector 1520. In embodiments comprising a clear light collector with a horizontal light capture target area, a greater degree of tilting may be desired than in embodiments comprising a light collector with a vertical light capture target area.

When sunlight is at a high solar altitude, such as during the middle of the day, it may be desirable to tilt the reflector 1580b backwards in order to reflect light towards the target light capture area of a light collector. For example, FIG. 15 shows reflector 1580b tilted backward by an amount $\theta_2$.

The tilt angle of the reflector may be fixed at a certain point, such as a point calculated according to a median value for performance. In certain embodiments, the sunlight collection system 1500 comprises a mechanism for tilting the reflector 1580 throughout the day to track the solar altitude of the Sun. Such a mechanism may be relatively tolerant. In certain embodiments, light reflector 1580 is configured to both rotate about light collector 1520 to track the Sun's solar azimuth angle, as discussed above, and to tilt to track the Sun's solar altitude. For example, light collection system 1500 may comprise a guide track on which light reflector 1580 rotates, wherein the guide track effects tilting of the reflector 1580 by an amount associated with the rotational position of the reflector.

While many of the embodiments described herein are described in the context of light collection systems incorporating curved, or parabolic, light reflectors, light reflectors in accordance with the embodiments described herein may be any suitable shape, size or configuration, and may comprise a single reflector, or multiple reflectors. For example, a reflector for use in a sunlight collection system may be planar, circular, spherical, semi-spherical, elliptical, rectangular, or any other shape or combination of shapes. Furthermore, a reflector may be curved or angled in any direction or dimension. In certain embodiments, a reflector is parabolic either the along a horizontal axis, a vertical axis, or both. In addition the shape of a reflector may vary based on the distance of a particular portion of the reflector to a target, such as a light collector. FIGS. 18-20 provide non-limiting example embodiments of reflectors for use in a sunlight collection system.

FIG. 18 illustrates an embodiment of a reflector 1880 incorporated in a light collection system having a generally straight configuration. Such a reflector 1880 may be passive or may rotate about light collector 1820. Furthermore, reflector 1880 may be elevated, such as by being disposed on, or integrated with, stilts or other elevating assembly. Unlike a parabolic reflector, reflector 1680 does not curve about light collector 1620. Such a reflector may be cheaper and/or more efficient to manufacture, ship, install, etc. However, a straight reflector may not provide as much captured reflected light as a curved reflector.

Static/passive and active reflective systems described herein may be designed around the concept that capturing sunlight with a reflective surface and directing it to a vertical versus a horizontal target can be more effective. One reason for this may be based on the reduction of the incident angle between the reflective panel surface and direct sunlight, thereby increasing the density of light on the panel. This concept is demonstrated in Table K, below. Table J, below, provides performance data obtained using a goniophotometer of static/passive and active reflector designs along with a prismatic collector and a segmented collimator at the base of the tube. The tests can be performed at five solar altitudes (20 to 60 degrees in 10 degree increments). The systems represented in Table J use a 14" diameter tube and roof opening, 1 square foot aperture, and a collimator at the base of each design. In certain embodiments, as supported in the table, a daylighting system in accordance with configurations disclosed herein may provide enough light from a single square-foot aperture in a roof to displace approximately 2 175-watt metal halide high bay lamps. Data relating to the various light collection assemblies is provided to illustrate the performance difference between the devices. These performance values include the associated direct solar illuminance at each solar altitude.

TABLE J

| System Design | Clear Dome With Collimator | Prismatic Cylinder Dome (PCD) With Collimator | PCD With Passive Reflector and Collimator | PCD With Active/Parabolic Reflector and Collimator |
| --- | --- | --- | --- | --- |
| 20 Degrees | 1.0 (units luminous flux) | 1.69 | 2.21 | 7.98 |
| 30 Degrees | 1.72 | 2.43 | 2.88 | 10.98 |
| 40 Degrees | 2.31 | 2.34 | 3.89 | 13.20 |
| 50 Degrees | 2.86 | 1.98 | 4.77 | 12.68 |
| 60 Degrees | 3.36 | 1.70 | 5.47 | 11.35 |

As demonstrated in Table J, a prismatic top cover design may increase performance with respect to a clear top cover at lower solar elevations and reduce performance at higher angles to prevent glare and the associated heat gain. Furthermore, a prismatic top cover design may provide better average performance for the day.

As shown, a passive design may increase performance at all solar elevations between at lease 20 and 60 degrees, especially with respect to higher elevations for configurations optimized to reflect light into the prismatic collector. With respect to an active design, performance may be increased substantially because light may be reflected into the collector around greater than 212 degrees of the 360 degree perimeter of the top cover, in certain embodiments. Furthermore, certain embodiments may be configured to maintain/control the amount of light captured by tilting a parabolic reflector based on performance requirements and/or the sun elevation.

The light reflector 1980 shown in FIG. 19 comprises a plurality of reflective panels that bend around light collector 1920. Each of the panels 1980a, 1980b, 1980c is substantially straight, but each lies in a plane at a different axial angle with respect to the vertical axis of light collector 1920. The shape of reflector 1980 may approximate that of a parabolic reflector, except with discrete straight segments as opposed to a continuous parabolic curve. The various panels of reflector 1980 may be adjustably rotatable with respect to one another. For example, the angle θ between two panels may be manually or otherwise adjustable as desired. The reflector 1980 may be passive or may rotate about light collector 1920.

One or more portions or segments of a light reflector in accordance with embodiments disclosed herein may be raised with respect to other portions or segments of the reflector. In the embodiment of FIG. 20, the peripheral end portions 2080a, 2080c of light reflector 2080 are raised by an amount $h_2$ with respect to the central portion 2080b. In certain embodiments, peripheral end portions of a reflector, such as the peripheral portions of a parabolic reflector, are positioned further from the center of an associated transparent cover than are more central portions. This variation in distance between the reflector and the transparent cover can lead to uneven collection and distribution of light. For example, in certain embodiments, downwardly-angled light reflected from farther distances must generally originate from a vertically higher position in order to reach the transparent cover than if the light were reflected from a closer position. Therefore, it may be desirable to raise peripheral ends of a reflector in order to promote even collection and distribution of light. Variation in height in portions of a reflector may comprise one or more generally discrete steps, such as in the embodiment of FIG. 20, or may be gradual. In certain embodiments, the top of the reflector is raised at certain portions, such as peripheral end portions, while the bottom edge maintains a continuous vertical position. In such embodiments, the height h of the reflector 2080 may vary over its width.

As described above, relative variation in height or size of portions of a light reflector may reduce potentially undesirable effects of variation in distance between the reflector and the light collector. In certain embodiments, optical elements integrated in or associated with a reflector may help reduce such effects. For example, peripheral end portions of a light reflector, or any other portion of a reflector, may comprise prisms for altering the angle and/or direction of light reflecting off the reflector's surface. With respect to FIG. 20, rather than, or in addition to, raising peripheral end portions 2080a and 2080c, such portions may comprise optical elements that bend light upward by some amount in order to compensate for the greater distance light reflected off such portions must travel. In certain embodiments, optical elements associated with bottom portions of a reflector bend light upward, and/or optical elements associated with one or more top portions bend light downward. With respect to the rectangular reflector 1880 of FIG. 18, reflector 1880 may comprise optical elements that bend light increasingly inward moving away from the center of the reflector. Furthermore, optical elements in an upper region of the reflector 1880 may turn light to a greater degree than optical elements in a lower region. In certain embodiments, optical elements associated with reflector 1880 approximately simulate light reflection characteristics similar to that of a parabolically or otherwise curved or configured reflector. By associating optical elements with a reflector, a flat, or otherwise shaped, reflector may increase the effective capture area of reflected light.

Figure 21:
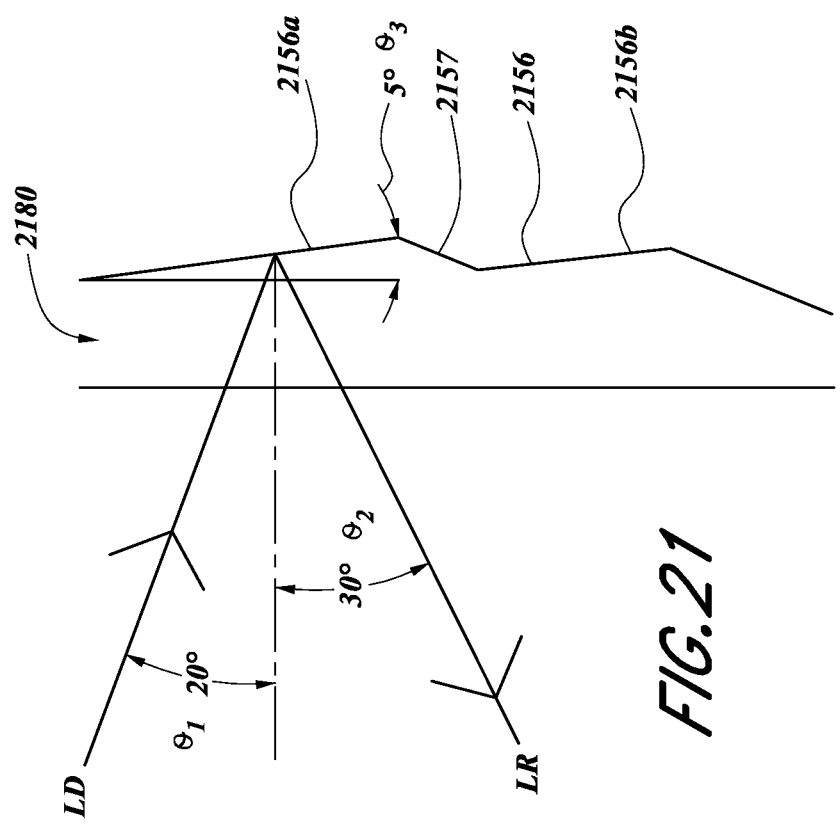
FIG. 21 is a cross sectional view of a light reflector.

FIG. 21 provides a cross-sectional view of a reflector 2180 including optical elements for reflecting light. In certain embodiments, the reflector 2180 is a vertical reflective prismatic panel. One or more surfaces, or portions of one or more surfaces, of the reflector 2180 may be angled with respect to the plane of the reflector 2180. For example, a back surface 2156 of reflector 2180 may comprise one or more angled surface regions 2156a, 2156b, that are angularly offset with respect to the plane of the reflector 1280 by an angle $\theta_3$ (e.g., 5°, as shown in FIG. 21). The surface 2156 may be reflective, such that direct light $L_D$ striking the surface is reflected towards a light capture target. Similarly to the effect of tilting the reflector, as described above with respect to FIG. 17, providing an angled surface 2156a, 2156b will generally change the resultant solar altitude or reflected light $L_R$ 10 degrees for every 5 degree angular offset with respect to the plane of the reflector, whether the offset is negative or positive. Specifically, in the embodiment of FIG. 21, the angle $\theta_2$ of reflected light $L_R$ with respect to a horizontal plane is 10° greater than the angle $\theta_1$ of direct light $L^D$, where the light reflector 2180 has a generally vertical orientation. The surface 2156 may include one or more tapering regions 2157 to allow for multiple angled sections 2156a, 2156b while maintaining a reflector 2180 thickness within a desired range.

In certain embodiments, the reflector 2180 comprises a transparent polymer, with a surface, such as surface 2156, being reflective. For example, surface 2156 may be rendered reflective by a vapor coating (e.g., aluminum, silver, etc.). Incorporating one or more optical elements into a reflector, such as by fabricate a prism in a clear material that has that slope, may serve as an alternative to reflector-tilting, or may be combined with reflector-tilting techniques in order to enhance the turning capabilities of the reflector. In certain embodiments, incorporating one or more reflective prisms in a reflector allows for maintenance of a reflective panel in a vertical orientation, with the reflective prism being configured to change the bisected angle.

In certain embodiments, a parabolic reflector comprises one or more optical elements that are designed to compensate for the distance to a light collector as you proceed further away from the vertex of the parabola. For example, a reflective panel may be flat (e.g., no prism) at or near the vertex, and increase in angle as you get closer to the rim angle, either continuously, or in discrete increments. This may allow for reduced height of the reflective panel to cover the height of the collector. With reference to FIG. 13, in certain embodiments, a parabolic reflector having a focal point p approximately 9 inches from the vertex v of the parabola is positioned approximately 1.2 inches from the outer surface of a light collector 1220 at the vertex v, but may be as far as 17.5 inches or more from the light collector at certain positions at the peripheral portions 1283 of the reflector (e.g., for a parabolic reflector 1280 having a 48-inch aperture 1281. Therefore, if light is reflected downward at, for example, 30 degrees, it may strike the light collector at a point approximately 0.7 inches below the reflected point at the vertex v, but greater than 10 inches below the reflected point at certain peripheral portions 1283.

In certain embodiments, prismatic element 1990 (FIG. 19) facing the direction of direct light $L_D$ bends the light prior to reflection by a reflective surface, as shown for example in FIG. 21. In such embodiments, the reflective surface may be substantially planar, or may include one or more angularly offset portions. Furthermore, a reflector in accordance with embodiments disclosed herein may include any suitable alternative optical elements in addition to, or in place of, those optical elements discussed above.

Figure 23:
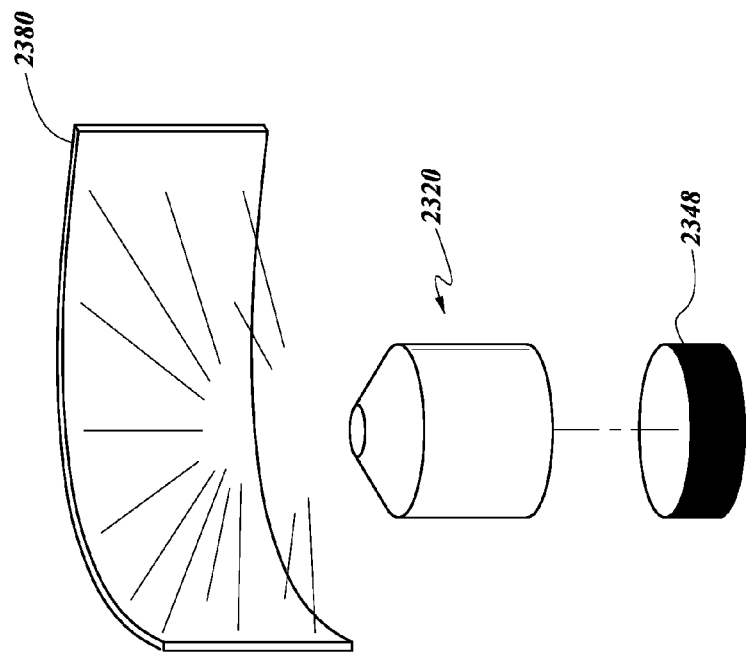
FIG. 23 is an exploded view of a light collection system comprising a reflector and a prismatic film.
Figure 22:
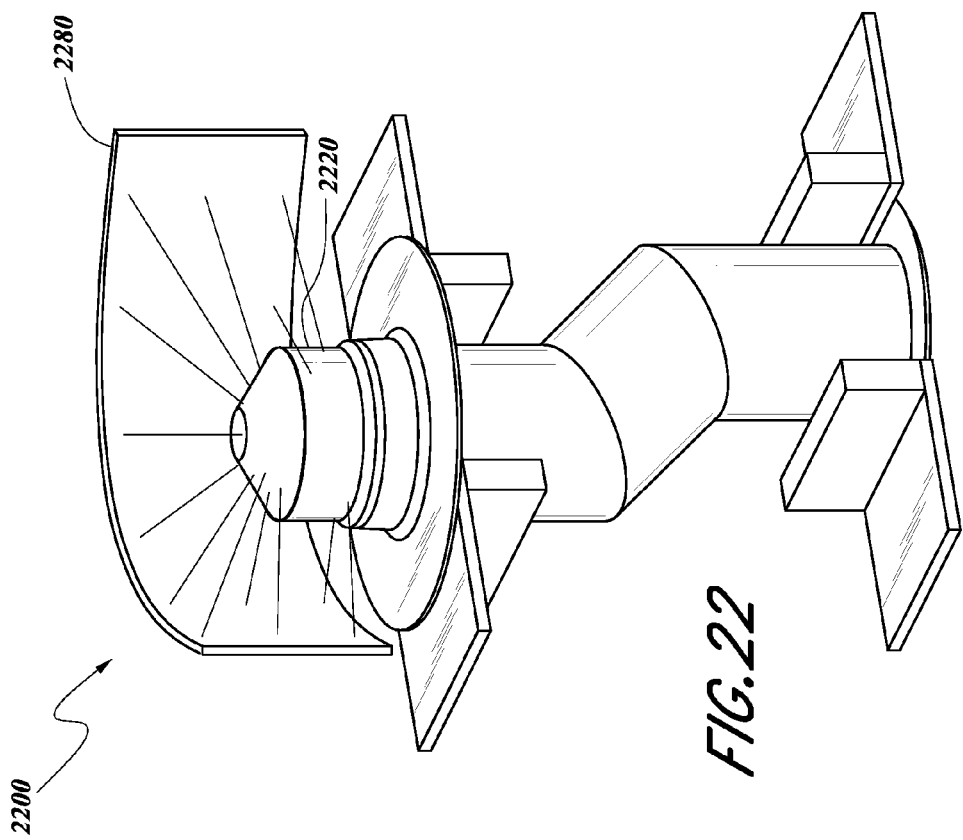
FIG. 22 is a perspective view of a TDD installation.

FIG. 22 provides a perspective view of a sunlight collection system 2200 in accordance with principles discussed herein. System 2200 includes a light collector 2220 and a reflector 2280. FIG. 23 provides an exploded view of the reflector 2280 and light collector 2220 of the system 2200. Prismatic film 2348 is nestingly disposed within light collector 2220. Prismatic films that may be similar to that shown in FIG. 23 are discussed above in connection with FIG. 6.

The sunlight intensity on the reflector 2280 will depend on, among other things, the incident angle of the sunlight with respect to the face of the reflector 2280. As an example, if light with an intensity of 1,000 lumens reflects off a reflective panel with an incident angle of 30 degrees, the intensity per area may be reduced to approximately 866 lumens (1,000×cos (30°)). Generally, the smaller the incident angle, the higher the light density. Table K provides calculated light intensity values for a reflector surface with respect to sunlight at incremental altitudes between 20 and 70 degrees. The table provides reflective panel light intensity values with respect to varying tilt angles of the reflector panel.

maintain performance. In certain embodiments, the use of a continuous large target (e.g., the width of a collector 1220) may allow for a substantial error without losing substantial focus and associated performance. The following table illustrates the reduction in performance versus azimuth tracking error with respect to certain embodiment TDD systems comprising a collector target having a substantially vertical light collection surface:

TABLE L

| Azimuth Tracking Error (degrees) | System Performance | Performance Reduction From 0 degrees |
|---|---|---|
| 0 | 100% | — |
| 5 | 88% | 12% |
| 10 | 83% | 17% |
| 15 | 70% | 30% |
| 20 | 55% | 45% |
| 25 | 42% | 58% |

As shown in Table L, in certain embodiments, the refractive lenses of the collector assembly are configured to direct light into a daylighting aperture at incident angles off axis within a certain range (e.g., approximately +/−5 degrees).

TABLE K

Reflective Panel Light Intensity (100% is maximum)

| Solar Altitude (degrees) | Tilt 25° Forward (%) | Tilt 20° Forward (%) | Tilt 15° Forward (%) | Tilt 10° Forward (%) | Tilt 5° Forward (%) | Vertical (%) | Tilt 5° Back (%) | Tilt 10° Back (%) | Tilt 15° Back (%) | Tilt 20° Back (%) | Tilt 25° Back (%) |
|---|---|---|---|---|---|---|---|---|---|---|---|
| 20 | 71 | 77 | 82 | 87 | 91 | 94 | 97 | 98 | 100 | 100 | 100 |
| 30 | 57 | 64 | 71 | 77 | 82 | 87 | 91 | 94 | 96 | 98 | 100 |
| 40 | 42 | 50 | 57 | 64 | 71 | 77 | 82 | 87 | 91 | 94 | 96 |
| 50 | 26 | 34 | 42 | 50 | 57 | 64 | 71 | 77 | 82 | 87 | 91 |
| 60 | 9 | 17 | 26 | 34 | 42 | 50 | 57 | 64 | 71 | 77 | 82 |
| 70 | — | — | 9 | 17 | 26 | 34 | 42 | 50 | 57 | 64 | 71 |

It may be desirable for light from the reflector to enter the collector assembly at a solar altitude of approximately 30 to 40 degrees in order for the optics of the collector assembly to be utilized effectively. Therefore, as demonstrated by Table K, in the presence of sunlight having a solar altitude of 60 degrees, it may be desirable to tilt the reflector back 15 to 20 degrees in order to reduce the solar altitude down to 30 or 40 degrees. On the other hand, in the presence of sunlight having a solar altitude of 20 degrees, it may be desirable to tilt the reflector forward 5 to 10 degrees to accomplish the same result.

It should be noted that tilting the reflective panel forward may change the resultant angle of reflection 10 degrees for every 5 degree panel tilt from vertical, while tilting the panel back from vertical may decrease the resultant angle of reflection by the same ratio. A sunlight-collection assembly comprising a reflective panel can be configured such that any desired angle of reflection (such as, for example, 20 degrees) is maintained.

With further reference to FIG. 12, in order to maintain the vertex of the parabola substantially in line with a vertical plane of the solar azimuth angle, it may be desirable for the reflector 1280 to rotate around the collector assembly 1220. For example, the reflector may rotate around the collector at approximately the same rate as the azimuth movement of the sun, within a certain degree of tolerance. Reflective or refractive concentrators that focus sunlight directly into an opening often require less than a degree of tracking error in order to Designing and fabricating a tracking mechanism that can operate with an error of +/−5 degrees may be significantly easier and/or less costly than tracking mechanisms requiring accuracy within, for example, a single degree. It also may be advantageous to operate a system that may maintain a 50% performance level with an error of greater than 20 degrees, as shown in Table L.

Table M provides the calculated effective area of a clear dome sunlight collection system without a parabolic reflective panel, as compared to the effective areas of example cylindrical collector assemblies and clear dome assemblies with reflector panels, at various solar altitudes and reflector panel tilt angles.

TABLE M

| Solar Altitude (degrees) | Cylinder-Dome System (panel tilt/ system effective area) | Clear Dome System (panel tilt/ system effective area) | Clear Dome/ No Ref. Panel (effective area) |
|---|---|---|---|
| 20 | vertical/487.8 in$^2$ | 25° fwd/226.8 in$^2$ | 49.7 in$^2$ |
| 30 | 5° back/471.2 in$^2$ | 20° fwd/232.5 in$^2$ | 72.6 in$^2$ |
| 40 | 10° back/450.9 in$^2$ | 15° fwd/235.3 in$^2$ | 93.3 in$^2$ |
| 50 | 15° back/420.5 in$^2$ | 10° fwd/236.8 in$^2$ | 111.2 in$^2$ |
| 60 | 20° back/387.3 in$^2$ | 5° fwd/231.3 in$^2$ | 125.7 in$^2$ |
| 70 | 25° back/346.8 in$^2$ | vertical/221.5 in$^2$ | 136.4 in$^2$ |

The data presented above demonstrates the potential performance of sunlight-collection systems incorporating reflective panels. As shown in Table M, the effective collection area from the parabolic reflector with a cylindrical collector assembly may be more than 300% greater than that of a horizontal tube opening without a reflector for certain solar angles. Furthermore, a collector assembly may provide a near constant illumination level over extended periods of the day due to the increased collection area at low solar angles when sunlight intensity levels are reduced and lower collection areas at high solar angles when sunlight intensity levels are higher.

As demonstrated, a clear dome system comprising a reflective panel may have a reduced effective collection area when compared to a cylindrical collector assembly due to reduced reflector collection of sunlight. This may occur due to higher incident angles of the sun to the reflector panel plane required to reflect light down to a horizontal opening. The area of the horizontal aperture may also be a limiting parameter when compared to a larger vertical capture area of a cylindrical collector assembly.

A series of computer models can be used to test the amount of light directed into a horizontal tube opening in a system incorporating a parabolic reflector. The tests could include comparisons of the performance of two parabolic reflector system designs, one using a cylinder-dome light collector, and the other using a conventional clear dome, and a system comprising a conventional clear dome without a reflector. The dimensions and other parameters are provided in Table N:

TABLE N

| System Configuration | Parabolic Reflector w/Prismatic Cylinder Dome | Parabolic Reflector w/Clear Dome | Clear Dome |
| --- | --- | --- | --- |
| Tube Diameter | 21" | 21" | 21" |
| Parabolic Reflector Aperture/Vertex | 70.8"/13.3" | 70.8"/13.3" | — |
| Parabolic Reflector Height | 36" | 36" | — |
| Ref./Dome Circumference Coverage | 212° | 212° | — |
| Cylinder Height/Diameter | 14.2"/23" | 14.2"/23" | — |
| Dome/Lens film Height | 8"/6" | 8"/6" | — |

Using the above design specifications and associated optics of collector lenses, transmission/reflection of the materials, and geometries, collimated light patterned after sunlight can be projected onto the system at solar elevations ranging from 20 degrees to 70 degrees in 10 degree increments. The intensity of the light for each solar elevation can be varied based on Illuminating Engineering Society of North America ("IES") Standards for Direct Insolation. The results do not take into account the diffuse content. The results are listed in Table O.

TABLE O

| Solar Altitude (Degrees from horizontal) | Clear Dome (units of luminous flux) | Parabolic Reflector w/Clear Dome (units of luminous flux) | Parabolic Reflector w/Cylindrical Collector (units of luminous flux) |
| --- | --- | --- | --- |
| 20 | 1.0 units | 9.43 units | 11.03 units |
| 30 | 1.77 units | 12.24 units | 14.75 units |
| 40 | 2.50 units | 13.43 units | 16.42 units |
| 50 | 3.15 units | 14.23 units | 16.24 units |
| 60 | 3.67 units | 14.52 units | 15.52 units |
| 70 | 4.06 units | 14.61 units | 13.84 units |

Table P provides a comparison of the computer simulated ratios of the clear dome to the parabolic reflector with cylindrical collector (Table N) to the same ratios from the analysis above of the effective sunlight collection areas (Table L). This fraction may be considered the optical efficiency of the dome.

TABLE P

| Solar Altitude (Degrees from horizontal) | Effective Area Ratios (cyl.-dome/clear dome) | Computer Simulated Performance Results Ratios (cyl.-dome/ clear dome) | Cylinder Dome Optical Efficiency (comp. sim. ratios/ eff. area ratio) |
| --- | --- | --- | --- |
| 20 | 9.45 | 11.03 | 117% |
| 30 | 6.35 | 8.31 | 131% |
| 40 | 4.69 | 6.56 | 140% |
| 50 | 3.65 | 5.16 | 141% |
| 60 | 2.96 | 4.24 | 143% |
| 70 | 2.44 | 3.41 | 140% |

As shown in Table P, for each of the incremental solar altitude measurements, the efficiency is greater than 100%. At a maximum, the expected results should not have exceeded 100% efficiency. Therefore, the principles disclosed herein yield far greater performance and results than expected or anticipated—up to 143% greater. These results may be an indication that the effective light capture area analysis performed above does not fully represent the performance-increasing effect that the addition of a reflector as disclosed herein may have on a daylight-collection system. The greater than 100% efficiency values in Table O may be attributable to one or more unknown or unforeseeable factors. For example, the unexpected performance may be due to an increase in the reflected light altitude angle from the periphery of the reflector. For example, if a parabolic reflector is vertical, any light reflecting at the center or vertex of the parabola may reflect at the same incident angle. There is an additional turning angle at positions away from the center of the reflector due to the curvature of the reflector, which may increase the reflected angle by a cosine function of the turning angle.

Discussion of the various embodiments disclosed herein has generally followed the embodiments illustrated in the figures. However, it is contemplated that the particular features, assemblies, or characteristics of any embodiments discussed herein may be combined in any suitable manner in one or more separate embodiments not expressly illustrated or described. For example, it is understood that an auxiliary light fixture can include multiple light sources, lamps, and/or light control surfaces. It is further understood that the auxiliary lighting fixtures disclosed herein may be used in at least some daylighting systems and/or other lighting installations besides TDDs.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined only by a fair reading of the claims that follow.

What is claimed is:

1. A daylighting apparatus configured to direct natural daylight into an interior of a building, the apparatus comprising:
    an at least partially transparent light-collecting assembly comprising a sidewall portion and a horizontal collector base aperture; and
    a light turning assembly comprising a prismatic pattern positioned and configured to turn light transmitted through the at least partially transparent light-collecting assembly towards the collector base aperture, wherein the light turning assembly has a height and a circumference;
    wherein the prismatic pattern comprises grooves that are defined by opposed faces, wherein the grooves comprise faces of varying angles, wherein the angles of the faces vary at different points along the circumference of the light turning assembly;
    wherein the daylighting apparatus is configured to provide natural illumination to the interior of the building when the daylighting apparatus is installed on a roof of the building and when the daylighting aperture is aligned with an opening formed in a roof of the building.

2. The daylighting apparatus of claim 1, further comprising a reflector positioned and configured to reflect natural daylight towards the light turning assembly, wherein the reflector is curved in one or more dimensions.

3. The daylighting apparatus of claim 1, further comprising a reflector positioned and configured to reflect natural daylight towards the light turning assembly, wherein the reflector is planar.

4. The daylighting apparatus of claim 1, further comprising a reflector positioned and configured to reflect natural daylight towards the light turning assembly, wherein the reflector is supported by one or more support legs configured to raise a lower edge of the reflector a distance above the roof of the building when the reflector is installed on the building.

5. The daylighting apparatus of claim 1, further comprising a reflector positioned and configured to reflect natural daylight towards the light turning assembly, wherein the reflector comprises one or more optical elements configured to alter an angle of reflection of at least a portion of light that strikes the reflector.

6. The daylighting apparatus of claim 5, wherein the one or more optical elements comprises a prismatic element.

7. The daylighting apparatus of claim 6, wherein the reflector comprises a first portion having a first prismatic element, and a second portion having a second prismatic element, wherein the first prismatic element and second prismatic element have different light-turning characteristics.

8. The daylighting apparatus of claim 1, further comprising a reflector positioned and configured to reflect natural daylight towards the light turning assembly, wherein the reflector comprises a plurality of segments.

9. The daylighting apparatus of claim 1, further comprising a reflector positioned and configured to reflect natural daylight towards the light turning assembly, wherein the reflector is configured to tilt forward and/or backward.

10. The daylighting apparatus of claim 1, further comprising a reflector positioned and configured to reflect natural daylight towards the light turning assembly, wherein the reflector is substantially parabolically-shaped along at least one axis of curvature.

11. The daylighting apparatus of claim 10, wherein a cross-sectional center of the light-collecting assembly is positioned at a focus point of the parabolically-shaped reflector.

12. The daylighting apparatus of claim 1, further comprising a reflector positioned and configured to reflect natural daylight towards the light turning assembly, wherein the reflector is configured to rotate about a first axis of rotation.

13. The daylighting apparatus of claim 12, wherein the first axis of rotation is located substantially at the center of the light-collecting assembly.

14. The daylighting apparatus of claim 12, wherein the reflector is configured to rotate about at least a second axis of rotation.

15. The daylighting apparatus of claim 12, wherein the reflector is configured to automatically rotate to substantially track a solar azimuth angle.

16. The daylighting apparatus of claim 1, wherein the light turning assembly comprises a prismatic element.

17. The daylighting apparatus of claim 1, wherein the light-collecting assembly comprises a vertical portion and a top cover portion.

18. The daylighting apparatus of claim 17, wherein at least one of the vertical portion or the top cover portion comprises a prismatic element.

19. The daylighting apparatus of claim 17, further comprising a prismatic film disposed within the vertical portion of the light-collecting assembly.

20. The daylighting apparatus of claim 17, wherein the top cover portion comprises a plurality of segments, wherein each of the plurality of segments has a different outside surface angle.

21. The daylighting apparatus of claim 17, wherein the top cover portion comprises a single exterior segment having a substantially unvarying slope.

22. The daylighting apparatus of claim 17, wherein the top cover portion comprises a single exterior segment having a substantially varying slope.

23. The daylighting apparatus of claim 1, wherein the angles of the faces vary at different points along the height of the light turning assembly.

24. The daylighting apparatus of claim 1, wherein the prismatic pattern achieves a more constant light output over the course of the day.

25. The daylighting apparatus of claim 1, wherein the grooves are oriented at a nonzero angle with respect to horizontal.

26. The daylighting apparatus of claim 1, wherein the grooves have a flat or curved cross-sectional shape.

27. A method of directing natural daylight into an interior of a building, the method comprising:
    transmitting natural daylight through a sidewall of a light-collecting apparatus; and
    turning the natural daylight using a light turning assembly towards a horizontal daylighting aperture such that a substantial portion of the natural daylight is available for illuminating the interior of the building, the light turning assembly having a height and a circumference;
    wherein the light turning assembly comprises grooves that are defined by opposed faces, wherein the grooves comprise faces of varying angles, wherein the angles of the faces vary at different points along the circumference of the light turning assembly.

28. The method of claim 27, further comprising reflecting natural daylight using a reflector towards the sidewall of the light-collecting apparatus and automatically positioning the reflector such that an apex of the reflector generally tracks a solar azimuth angle during daylight hours.

29. The method of claim 27, wherein the grooves are oriented at a nonzero angle with respect to horizontal.

30. A daylighting apparatus for providing natural light to the interior of a building, the apparatus comprising:
- a transparent light-collecting assembly; and
- a light turning assembly having a height and a circumference, wherein the light turning assembly comprises grooves that are defined by opposed faces, wherein the grooves comprise faces of varying angles, wherein the angles of the faces vary at different points along the circumference of the light turning assembly.

31. The daylighting apparatus of claim 30, wherein the grooves are oriented at a nonzero angle with respect to horizontal.

32. A daylighting apparatus for providing natural daylight to the interior of a building, the apparatus comprising:
- a daylight collector defining a daylighting aperture configured to be positioned substantially horizontally or substantially parallel to a plane of a roof of the building surface when the daylighting apparatus is installed on the building; and
- a light turning optical element configured to turn daylight transmitted through the daylight collector towards the daylighting aperture, wherein the light turning optical element has a height and a circumference;
- wherein the light turning optical element comprises grooves that are defined by opposed faces, wherein the grooves comprise faces of varying angles, wherein the angles of the faces vary at different points along the circumference of the light turning optical element.

33. The apparatus of claim 32, further comprising further comprising a reflector positioned and configured to reflect daylight towards the daylight collector and a tracking system configured to turn the reflector such that an apex of the reflector generally tracks a solar azimuth angle during daylight hours.

34. The apparatus of claim 32, further comprising a reflector positioned and configured to reflect daylight towards the daylight collector, wherein the reflector is configured to reflect daylight into the daylighting aperture such that reflected daylight is directed through a surface extending upwardly from at least half of a perimeter of the daylighting aperture.

35. The apparatus of claim 34, wherein the surface extends upwardly from at least 58% of the perimeter of the daylighting aperture.

36. The apparatus of claim 32, further comprising a reflector positioned and configured to reflect daylight towards the daylight collector, wherein the reflector has a luminous reflectance greater than or equal to about 95% when measured with respect to CIE Illuminant $D_{65}$.

37. The apparatus of claim 32, wherein the light turning optical element comprises a prismatic film positioned to refract light passing through the daylight collector.

38. The apparatus of claim 32, wherein the light turning optical element comprises a reflector positioned to reflect light passing through the daylight collector.

39. The apparatus of claim 32, wherein the grooves are oriented at a nonzero angle with respect to horizontal.

* * * * *

UNITED STATES PATENT AND TRADEMARK OFFICE
CERTIFICATE OF CORRECTION

PATENT NO.         : 8,837,048 B2                                              Page 1 of 1
APPLICATION NO.    : 13/687803
DATED              : September 16, 2014
INVENTOR(S)        : Paul August Jaster It is certified that error appears in the above-identified patent and that said Letters Patent is hereby corrected as shown below:

In the Specification

In column 21 at line 48, Change "154 int." to --145 $in^2$.--.

Signed and Sealed this
First Day of September, 2015

Michelle K. Lee
*Director of the United States Patent and Trademark Office*